US012289608B2

(12) United States Patent
Elazzouni et al.

(10) Patent No.: US 12,289,608 B2
(45) Date of Patent: Apr. 29, 2025

(54) IN-DEVICE COEXISTENCE INTERFERENCE PARAMETERS

(71) Applicant: QUALCOMM Incorporated, San Diego, CA (US)

(72) Inventors: Sherif Elazzouni, San Diego, CA (US); Ozcan Ozturk, San Diego, CA (US); Xipeng Zhu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/885,449

(22) Filed: Aug. 10, 2022

(65) Prior Publication Data

US 2024/0056827 A1    Feb. 15, 2024

(51) Int. Cl.
*H04W 16/14* (2009.01)
*H04L 5/14* (2006.01)
(Continued)

(52) U.S. Cl.
CPC ............ *H04W 16/14* (2013.01); *H04L 5/1469* (2013.01); *H04W 76/15* (2018.02); *H04W 76/28* (2018.02); *H04W 84/06* (2013.01)

(58) Field of Classification Search
CPC ..... H04W 16/14; H04W 76/15; H04W 76/28; H04W 84/06; H04L 5/1469
(Continued)

(56) References Cited

U.S. PATENT DOCUMENTS 8,619,732 B2 * 12/2013 Khairmode ............ H04B 1/401
370/466
9,386,600 B2 * 7/2016 Ahn ...................... H04W 16/14
(Continued)

FOREIGN PATENT DOCUMENTS

EP          3668222 A1      6/2020
EP          3751890 A1     12/2020
WO     WO-2021026857 A1    2/2021

OTHER PUBLICATIONS

International Search Report and Written Opinion—PCT/US2023/071731—ISA/EPO—Nov. 15, 2023.

*Primary Examiner* — Melvin H Pollack
(74) *Attorney, Agent, or Firm* — Holland & Hart LLP/Qualcomm

(57) ABSTRACT

Methods, systems, and devices for wireless communication are described. A user equipment (UE) may transmit assistance information indicating a type of in-device coexistence (IDC) interference at the UE, and indicating a set of associated interference parameters that correspond to an interference pattern of the IDC interference in a time domain, a frequency domain, or both. The set of interference parameters and the interference pattern may describe a pattern of the IDC interference in the time domain, the frequency domain, or both. The UE may receive a message indicating one or more operating parameters associated with a time period that is based on the interference pattern. The operating parameters may be based on the type of IDC, the set of interference parameters, and the interference pattern, and may enable the UE to communicate with a network entity to maintain signaling throughput while decreasing effects of the IDC interference.

28 Claims, 21 Drawing Sheets

(51) Int. Cl.
*H04W 76/15* (2018.01)
*H04W 76/28* (2018.01)
*H04W 84/06* (2009.01)

(58) Field of Classification Search
USPC .......................................................... 370/329
See application file for complete search history.

(56) References Cited

U.S. PATENT DOCUMENTS

| | | | |
|---|---|---|---|
| 9,532,245 B2* | 12/2016 | Wei | H04W 72/1215 |
| 9,655,160 B2* | 5/2017 | Feuersaenger | H04B 15/00 |
| 9,681,382 B2* | 6/2017 | Zhang | H04B 7/0473 |
| 9,699,760 B2* | 7/2017 | Cui | H04W 64/00 |
| 9,723,505 B2* | 8/2017 | Baghel | H04W 16/14 |
| 9,781,735 B2* | 10/2017 | Comsa | H04W 72/1215 |
| 9,820,159 B2* | 11/2017 | Ghasemzadeh | H04W 72/044 |
| 9,900,895 B2* | 2/2018 | Koo | H04W 72/1215 |
| 10,051,550 B2* | 8/2018 | Lee | H04W 16/32 |
| 10,123,345 B2* | 11/2018 | Narasimha | H04L 1/188 |
| 10,299,150 B2* | 5/2019 | Emmanuel | H04W 48/18 |
| 10,390,350 B2* | 8/2019 | Susitaival | H04L 5/001 |
| 10,447,489 B2* | 10/2019 | Sharma | H04W 12/122 |
| 10,728,902 B2* | 7/2020 | Sharma | H04W 72/541 |
| 10,880,907 B2* | 12/2020 | Park | H04W 72/1215 |
| 10,897,772 B2* | 1/2021 | Ingale | H04W 72/1215 |
| 11,095,352 B2* | 8/2021 | Kung | H04B 7/0695 |
| 11,394,511 B2* | 7/2022 | Wu | H04B 15/00 |
| 11,477,796 B2* | 10/2022 | Lovlekar | H04W 72/1215 |
| 11,678,327 B2* | 6/2023 | Park | H04W 72/21 370/329 |
| 11,751,204 B2* | 9/2023 | Jeon | H04L 5/001 370/329 |
| 11,758,588 B2* | 9/2023 | Xu | H04W 88/14 370/329 |
| 11,792,670 B2* | 10/2023 | Jin | H04L 25/0226 370/329 |
| 11,800,390 B2* | 10/2023 | Karjalainen | H04B 7/0632 |
| 11,800,550 B2* | 10/2023 | Lee | H04L 5/0062 |
| 11,805,547 B2* | 10/2023 | Golitschek Edler von Elbwart | H04W 24/08 |
| 11,818,755 B2* | 11/2023 | Meng | H04W 28/0294 |
| 11,924,676 B2* | 3/2024 | Shilov | H04W 72/02 |
| 11,943,797 B2* | 3/2024 | Li | H04L 5/0092 |
| 12,010,067 B2* | 6/2024 | Sandberg | H04L 5/0057 |
| 12,021,789 B2* | 6/2024 | Barac | H04J 11/0056 |
| 12,035,159 B2* | 7/2024 | Cui | H04W 24/08 |
| 12,035,373 B2* | 7/2024 | Xiong | H04W 72/1268 |
| 12,041,528 B2* | 7/2024 | Park | H04W 36/305 |
| 12,082,212 B2* | 9/2024 | Hassan Hussein | H04W 72/04 |
| 12,101,763 B2* | 9/2024 | Islam | H04W 72/23 |
| 12,101,806 B2* | 9/2024 | Fehrenbach | H04W 74/0808 |
| 2013/0336281 A1* | 12/2013 | Ahn | H04W 72/541 370/330 |
| 2014/0141825 A1* | 5/2014 | Koo | H04W 48/08 455/501 |
| 2016/0174101 A1* | 6/2016 | Duval | H04W 72/23 455/522 |
| 2022/0174512 A1* | 6/2022 | Rune | H04W 24/10 |
| 2022/0353875 A1* | 11/2022 | Jiang | H04L 5/14 |
| 2023/0023825 A1* | 1/2023 | Liu | H04L 5/0057 |
| 2023/0246724 A1* | 8/2023 | Pateromichelakis | H04W 72/0453 370/329 |
| 2023/0254708 A1* | 8/2023 | Suh | H04W 16/28 370/329 |
| 2023/0284286 A1* | 9/2023 | Karimidehkordi | H04L 5/0048 370/329 |
| 2023/0421186 A1* | 12/2023 | Madier | H04B 1/10 |
| 2024/0040551 A1* | 2/2024 | Vaidya | H04W 76/15 |
| 2024/0163058 A1* | 5/2024 | Taghizadeh Motlagh | H04L 5/0051 |
| 2024/0179790 A1* | 5/2024 | Schliwa-Bertling | H04W 76/15 |
| 2024/0188055 A1* | 6/2024 | Su | H04W 56/0045 |
| 2024/0188178 A1* | 6/2024 | Fehrenbach | H04W 52/0216 |

* cited by examiner

IN-DEVICE COEXISTENCE INTERFERENCE PARAMETERS

FIELD OF TECHNOLOGY

The following relates to wireless communication, including in-device coexistence (IDC) interference parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support in-device coexistence (IDC) interference parameters. For example, the described techniques provide for the indication of IDC interference parameters corresponding to a pattern of IDC interference, which may enable a network entity to reduce the effects of IDC interference on communications between a user equipment (UE) and the network entity. In some examples, a UE may transmit UE assistance information (UAI) indicating a type of IDC interference (e.g., intermodulation between nodes), an interference pattern associated with the interference, or a set of interference parameters that described the interference pattern in a time or frequency domain, or a combination thereof. The network entity may use the information included in the UAI to determine how to accommodate for (e.g., reduce or mitigate) the IDC interference. In some examples, the network entity may transmit a message to the UE indicating a set of operating parameters the UE is to use during a time period, and the set of operating parameters may be based on the type of IDC interference, the interference pattern, and the set of interference parameters. The UE may communicate with the network entity during the time period using the set of operating parameters. That is, the network entity may indicate parameters for how the UE is to operate during the time period (e.g., a time period in which IDC interference may occur) to mitigate or reduce the IDC interference and the IDC interference effects on communications between the UE and the network entity.

A method for wireless communication at a UE is described. The method may include transmitting assistance information associated with the UE, the assistance information indicating a type of IDC interference at the UE and indicating a set of interference parameters associated with the IDC interference, where the set of interference parameters corresponds to an interference pattern of the IDC interference in a time domain, receiving a message indicating one or more operating parameters associated with a time period that is based on the interference pattern, the one or more operating parameters based on the type of IDC interference, the set of interference parameters, and the interference pattern, and communicating with a network entity during the time period based on the one or more operating parameters.

An apparatus for wireless communication at a UE is described. The apparatus may include a processor, memory coupled with the processor, and instructions stored in the memory. The instructions may be executable by the processor to cause the apparatus to transmit assistance information associated with the UE, the assistance information indicating a type of IDC interference at the UE and indicating a set of interference parameters associated with the IDC interference, where the set of interference parameters corresponds to an interference pattern of the IDC interference in a time domain, receive a message indicating one or more operating parameters associated with a time period that is based on the interference pattern, the one or more operating parameters based on the type of IDC interference, the set of interference parameters, and the interference pattern, and communicate with a network entity during the time period based on the one or more operating parameters.

Another apparatus for wireless communication at a UE is described. The apparatus may include means for transmitting assistance information associated with the UE, the assistance information indicating a type of IDC interference at the UE and indicating a set of interference parameters associated with the IDC interference, where the set of interference parameters corresponds to an interference pattern of the IDC interference in a time domain, means for receiving a message indicating one or more operating parameters associated with a time period that is based on the interference pattern, the one or more operating parameters based on the type of IDC interference, the set of interference parameters, and the interference pattern, and means for communicating with a network entity during the time period based on the one or more operating parameters.

A non-transitory computer-readable medium storing code for wireless communication at a UE is described. The code may include instructions executable by a processor to transmit assistance information associated with the UE, the assistance information indicating a type of IDC interference at the UE and indicating a set of interference parameters associated with the IDC interference, where the set of interference parameters corresponds to an interference pattern of the IDC interference in a time domain, receive a message indicating one or more operating parameters associated with a time period that is based on the interference pattern, the one or more operating parameters based on the type of IDC interference, the set of interference parameters, and the interference pattern, and communicate with a network entity during the time period based on the one or more operating parameters.

Some examples of the method, apparatuses, and non-transitory computer-readable medium described herein may further include operations, features, means, or instructions for receiving control signaling indicating a time division duplex (TDD) pattern, a discontinuous reception (DRX) pattern, a gap pattern, or any combination thereof based on the type of IDC, the set of interference parameters, and the interference pattern and communicating with the network entity during the time period based on the TDD pattern, the DRX pattern, the gap pattern, or any combination thereof.

In some examples of the method, apparatuses, and non-transitory computer-readable medium described herein, transmitting the assistance information may include operations, features, means, or instructions for transmitting a UAI message that indicates a frequency intermodulation between a master node (MN) and a secondary node (SN), where the IDC interference may be based on the frequency intermodulation.

Some examples of the method, apparatuses, and non-transitory computer-readable medium described herein may further include operations, features, means, or instructions for transmitting the assistance information indicating uplink traffic at the UE and indicating the set of interference parameters, where the set of interference parameters corresponds to the interference pattern of the uplink traffic in the time domain and in a frequency domain, receiving control signaling indicating to delay reception of a Wi-Fi transmission until after the time period based on the uplink traffic, the set of interference parameters, and the interference pattern, and receiving the Wi-Fi transmission after the time period based on the control signaling.

Some examples of the method, apparatuses, and non-transitory computer-readable medium described herein may further include operations, features, means, or instructions for transmitting the assistance information indicating an extended synchronous connection oriented (eSCO) interference and indicating the set of interference parameters, where the set of interference parameters corresponds to the interference pattern of the eSCO interference in the time domain and in a frequency domain, receiving control signaling indicating an eSCO interval including a transmit slot and a receive slot and indicating a start time of the eSCO interval based on the eSCO interference, the set of interference parameters, and the interference pattern, and receiving a signal during the eSCO interval based on the control signaling.

Some examples of the method, apparatuses, and non-transitory computer-readable medium described herein may further include operations, features, means, or instructions for transmitting the assistance information indicating a bit period interference at a non-terrestrial device and indicating the set of interference parameters including a start time parameter, a duration parameter, and an offset parameter, where the set of interference parameters corresponds to the interference pattern of the bit period interference in the time domain and in a frequency domain, receiving control signaling indicating a phase associated with a bit period for communicating with the non-terrestrial device based on the bit period interference, the start time parameter, the duration parameter, and the offset parameter, and communicating with the non-terrestrial device during the time period based on the phase.

Some examples of the method, apparatuses, and non-transitory computer-readable medium described herein may further include operations, features, means, or instructions for transmitting the assistance information indicating a frequency intermodulation interference between an MN and an SN and indicating the set of interference parameters, where the set of interference parameters includes at least a dual connectivity (DC) parameter and corresponds to the interference pattern of the frequency intermodulation interference in the time domain and a frequency domain, receiving control signaling indicating the one or more operating parameters associated with the time period that may be based on the frequency intermodulation interference and the DC parameter, and receiving one or more messages from the MN and the SN during the time period based on the one or more operating parameters.

In some examples of the method, apparatuses, and non-transitory computer-readable medium described herein, transmitting the assistance information may include operations, features, means, or instructions for transmitting a UAI message that indicates the set of interference parameters, where the set of interference parameters includes a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

In some examples of the method, apparatuses, and non-transitory computer-readable medium described herein, the periodicity parameter indicates a periodicity of the interference pattern.

In some examples of the method, apparatuses, and non-transitory computer-readable medium described herein, the periodicity parameter indicates a start time, an end time, and a duration of the interference pattern.

In some examples of the method, apparatuses, and non-transitory computer-readable medium described herein, the time offset parameter indicates a time offset between a first start time of the interference pattern and a second start time of a transmission that creates the IDC interference.

In some examples of the method, apparatuses, and non-transitory computer-readable medium described herein, the power parameter indicates a maximum power the UE may be to use during the time period.

In some examples of the method, apparatuses, and non-transitory computer-readable medium described herein, transmitting the assistance information may include operations, features, means, or instructions for transmitting a UAI message that indicates the set of interference parameters that corresponds to the interference pattern of the IDC interference in a frequency domain, where the set of interference parameters includes a bandwidth part (BWP) parameter, a physical resource block set parameter, a center frequency parameter, a bandwidth parameter, a DC parameter, or any combination thereof.

In some examples of the method, apparatuses, and non-transitory computer-readable medium described herein, the BWP parameter indicates an identifier of a BWP associated with the IDC interference.

In some examples of the method, apparatuses, and non-transitory computer-readable medium described herein, the physical resource block set parameter indicates a physical resource block in which the interference pattern begins, a quantity of physical resource blocks included in the interference pattern, or both.

In some examples of the method, apparatuses, and non-transitory computer-readable medium described herein, the DC parameter indicates whether the IDC interference may be associated with a frequency intermodulation in DC.

A method for wireless communication at a network entity is described. The method may include receiving assistance information associated with a UE, the assistance information indicating a type of IDC interference at the UE and indicating a set of interference parameters associated with the IDC interference, where the set of interference parameters corresponds to an interference pattern of the IDC interference in a time domain, transmitting a message indicating one or more operating parameters associated with a time period that is based on the interference pattern, the one or more operating parameters based on the type of IDC interference, the set of interference parameters, and the interference pattern, and communicating with the UE during the time period based on the one or more operating parameters.

An apparatus for wireless communication at a network entity is described. The apparatus may include a processor, memory coupled with the processor, and instructions stored in the memory. The instructions may be executable by the processor to cause the apparatus to receive assistance information associated with a UE, the assistance information indicating a type of IDC interference at the UE and indicating a set of interference parameters associated with the IDC interference, where the set of interference parameters corresponds to an interference pattern of the IDC interference in a time domain, transmit a message indicating one or more operating parameters associated with a time period that is based on the interference pattern, the one or more operating parameters based on the type of IDC interference, the set of interference parameters, and the interference pattern, and communicate with the UE during the time period based on the one or more operating parameters.

Another apparatus for wireless communication at a network entity is described. The apparatus may include means for receiving assistance information associated with a UE, the assistance information indicating a type of IDC interference at the UE and indicating a set of interference parameters associated with the IDC interference, where the set of interference parameters corresponds to an interference pattern of the IDC interference in a time domain, means for transmitting a message indicating one or more operating parameters associated with a time period that is based on the interference pattern, the one or more operating parameters based on the type of IDC interference, the set of interference parameters, and the interference pattern, and means for communicating with the UE during the time period based on the one or more operating parameters.

A non-transitory computer-readable medium storing code for wireless communication at a network entity is described. The code may include instructions executable by a processor to receive assistance information associated with a UE, the assistance information indicating a type of IDC interference at the UE and indicating a set of interference parameters associated with the IDC interference, where the set of interference parameters corresponds to an interference pattern of the IDC interference in a time domain, transmit a message indicating one or more operating parameters associated with a time period that is based on the interference pattern, the one or more operating parameters based on the type of IDC interference, the set of interference parameters, and the interference pattern, and communicate with the UE during the time period based on the one or more operating parameters.

Some examples of the method, apparatuses, and non-transitory computer-readable medium described herein may further include operations, features, means, or instructions for transmitting control signaling indicating a TDD pattern, a DRX pattern, a gap pattern, or any combination thereof based on the type of IDC, the set of interference parameters, and the interference pattern and communicating with the UE during the time period based on the TDD pattern, the DRX pattern, the gap pattern, or any combination thereof.

In some examples of the method, apparatuses, and non-transitory computer-readable medium described herein, receiving the assistance information may include operations, features, means, or instructions for receiving a UAI message that indicates a frequency intermodulation between an MN and an SN, where the IDC interference may be based on the frequency intermodulation.

Some examples of the method, apparatuses, and non-transitory computer-readable medium described herein may further include operations, features, means, or instructions for receiving the assistance information indicating uplink traffic at the UE and indicating the set of interference parameters, where the set of interference parameters corresponds to the interference pattern of the uplink traffic in the time domain and in a frequency domain, transmitting control signaling indicating to delay reception of a Wi-Fi transmission until after the time period based on the uplink traffic, the set of interference parameters, and the interference pattern, and transmitting the Wi-Fi transmission after the time period based on the control signaling.

Some examples of the method, apparatuses, and non-transitory computer-readable medium described herein may further include operations, features, means, or instructions for receiving the assistance information indicating an eSCO interference and indicating the set of interference parameters, where the set of interference parameters corresponds to the interference pattern of the eSCO interference in the time domain and in a frequency domain, transmitting control signaling indicating an eSCO interval including a transmit slot and a receive slot and indicating a start time of the eSCO interval based on the eSCO interference, the set of interference parameters, and the interference pattern, and transmitting a signal during the eSCO interval based on the control signaling.

Some examples of the method, apparatuses, and non-transitory computer-readable medium described herein may further include operations, features, means, or instructions for receiving the assistance information indicating a bit period interference at a non-terrestrial device and indicating the set of interference parameters including a start time parameter, a duration parameter, and an offset parameter, where the set of interference parameters corresponds to the interference pattern of the bit period interference in the time domain and in a frequency domain, transmitting control signaling indicating a phase associated with a bit period for communicating with the non-terrestrial device based on the bit period interference, the start time parameter, the duration parameter, and the offset parameter, and communicating with the non-terrestrial device during the time period based on the phase.

Some examples of the method, apparatuses, and non-transitory computer-readable medium described herein may further include operations, features, means, or instructions for receiving the assistance information indicating a frequency intermodulation interference between an MN and an SN and indicating the set of interference parameters, where the set of interference parameters includes at least a DC parameter and corresponds to the interference pattern of the frequency intermodulation interference in the time domain and a frequency domain, transmitting control signaling indicating the one or more operating parameters associated with the time period that may be based on the frequency intermodulation interference and the DC parameter, and transmitting one or more messages from the MN and the SN during the time period based on the one or more operating parameters.

In some examples of the method, apparatuses, and non-transitory computer-readable medium described herein, receiving the assistance information may include operations, features, means, or instructions for receiving a UAI message that indicates the set of interference parameters, where the set of interference parameters includes a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

In some examples of the method, apparatuses, and non-transitory computer-readable medium described herein, the periodicity parameter indicates a periodicity of the interference pattern.

In some examples of the method, apparatuses, and non-transitory computer-readable medium described herein, the periodicity parameter indicates a start time, an end time, and a duration of the interference pattern.

In some examples of the method, apparatuses, and non-transitory computer-readable medium described herein, the time offset parameter indicates a time offset between a first start time of the interference pattern and a second start time of a transmission that creates the IDC interference.

In some examples of the method, apparatuses, and non-transitory computer-readable medium described herein, the power parameter indicates a maximum power the UE may be to use during the time period.

In some examples of the method, apparatuses, and non-transitory computer-readable medium described herein, receiving the assistance information may include operations, features, means, or instructions for receiving a UAI message that indicates the set of interference parameters that corresponds to the interference pattern of the IDC interference in a frequency domain, where the set of interference parameters includes a BWP parameter, a physical resource block set parameter, a center frequency parameter, a bandwidth parameter, a DC parameter, or any combination thereof.

In some examples of the method, apparatuses, and non-transitory computer-readable medium described herein, the BWP parameter indicates an identifier of a BWP associated with the IDC interference.

In some examples of the method, apparatuses, and non-transitory computer-readable medium described herein, the physical resource block set parameter indicates a physical resource block in which the interference pattern begins, a quantity of physical resource blocks included in the interference pattern, or both.

In some examples of the method, apparatuses, and non-transitory computer-readable medium described herein, the DC parameter indicates whether the IDC interference may be associated with a frequency intermodulation in DC.

DETAILED DESCRIPTION

Figure 1:
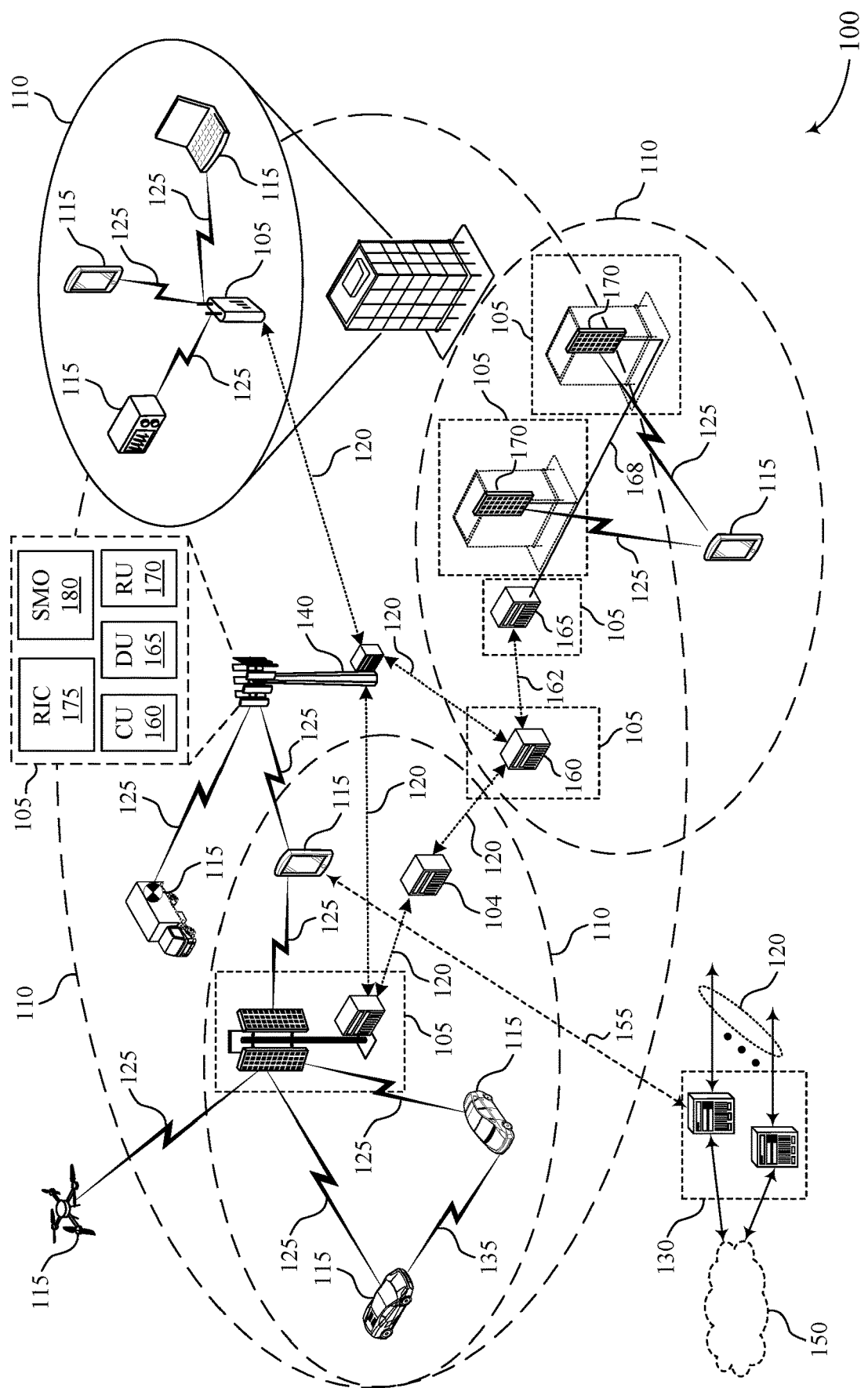
FIG. 1 illustrates an example of a wireless communications system that supports in-device coexistence interference (IDC) parameters in accordance with one or more aspects of the present disclosure.

A user equipment (UE) may include multiple transceivers of different radio access technologies (RATs) (e.g., New Radio (NR), Long-Term Evolution (LTE), Wi-Fi). Due to the size of the UE, transceivers of the UE may be located relatively close together such that the use of the transceivers may cause in-device coexistence (IDC) interference at the UE when operating using the different RATs. The IDC interference may result in decreased signal quality and potential loss of data. In some examples, a UE may detect IDC and provide information about the IDC to a network entity. The network entity may use the information to adjust, modify, or determine operating parameters for the UE that may restrict radio resource usage in a time domain, a frequency domain, or both to reduce or avoid the IDC interference.

In some examples, however, interference mitigation techniques in the time domain or the frequency domain may fail to reduce the IDC interference, or may result in other system inefficiencies. For example, in the frequency domain, the network entity may refrain from scheduling an entire frequency resource (e.g., an entire carrier, bandwidth part (BWP), or physical resource block (PRB)) even if only a portion of the frequency resource experiences IDC interference, which may result in wasted spectrum as well as an overloading of other frequency resources that are being used. In addition, switching frequencies may involve overhead, making interference mitigation techniques in the frequency domain effective for small amounts of time. Alternatively, if the UE fails to specify a frequency at which the network entity is to apply time domain interference mitigation techniques, the network entity may apply the techniques to an entire frequency band, which may be inefficient and result in wasted resources.

The techniques described herein support indicating IDC interference parameters corresponding to a pattern of IDC interference, which may enable a network entity to reduce the effects of IDC interference on communications between a UE and the network entity. In some examples, a UE may transmit UE assistance information (UAI) indicating a type of IDC interference (e.g., intermodulation between nodes), an interference pattern associated with the interference, and a set of interference parameters that described the interference pattern in a time domain, a frequency domain, or both. The network entity may use the information included in the UAI to determine how to accommodate for the IDC interference while maintaining signaling throughput. In some examples, the network entity may transmit a message to the UE indicating a set of operating parameters the UE is to use during a time period that is based on the type of IDC interference, the interference pattern, and the interference parameters. The UE may then communicate with the network entity during the time period and using the operating parameters. That is, the network entity may indicate how the UE is to operate during the time period (e.g., a time period in which IDC interference may occur) to mitigate the IDC interference and its effects on communications between the UE and the network entity.

Aspects of the disclosure are initially described in the context of wireless communications systems. Aspects of the disclosure are then described in the context of Wi-Fi transmission patterns, Bluetooth transmission patterns, and process flows. Aspects of the disclosure are further illustrated by and described with reference to apparatus diagrams, system diagrams, and flowcharts that relate to IDC interference parameters.

FIG. 1 illustrates an example of a wireless communications system 100 that supports IDC interference parameters in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support IDC interference parameters as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (RAT) (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a CA configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2 X) communications, vehicle-to-vehicle (V2V) communications, or some combination of these. A vehicle may signal information related to traffic conditions, signal scheduling, weather, safety, emergencies, or any other information relevant to a V2 X system. In some examples, vehicles in a V2 X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a CA configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some UEs 115 in the wireless communications system 100 may experience IDC interference in various multi-radio dual connectivity (MR-DC) systems, including NR-DC and E-UTRA New Radio (EN)-DC (EN-DC) systems, as well as for other RATs such as Wi-Fi. A UE 115 may include multiple radio modules with transceivers that support different RATs and communications such as NR, Wi-Fi, Global Positioning System (GPS), and Bluetooth, among other examples. Because of the small size of the UE 115, and thus the close proximity of these transceivers within the same UE 115, the UE 115 may experience out-of-band interference or IDC interference, where communications of different transceivers (e.g., Wi-Fi transmissions and NR receptions) may interfere if their respective frequencies are relatively close. For example, some IDC interference may be based on a transmit power of a transmitted signal (e.g., a Wi-Fi beacon) being much higher than a receive power of a received signal (e.g., an NR downlink transmission). In some coexistence scenarios (e.g., different RATs within a same UE 115 operating on adjacent frequencies), filtering technologies may fail to provide sufficient rejection to avoid interference. Additionally, using a single, generic radio frequency design to mitigate the IDC interference may fail in some cases.

In some coexistence scenarios, a UE 115 may transmit NR communications in a frequency band of 2300 MHz to 2400 MHz (e.g., N40 band) and 2496 MHz to 2690 MHz (e.g., N41 band). In addition, Wi-fi and Bluetooth communications may occur on an industrial, scientific, and medical (ISM) frequency band from 2400 MHz to 2483.5 MHz. The close proximity of the NR and ISM bands may cause IDC interference for the UE 115 when performing NR, Wi-Fi, or Bluetooth communications. For example, NR transmissions in the N40 band and the N41 band may interfere with the UE 115 receiving Wi-Fi transmissions in the ISM band, and vice versa. In addition, the NR communications in the N40 band and the N41 band may interfere with Bluetooth communications on the ISM band. In some examples, other NR bands used for uplink transmissions (e.g., N13, N14 bands) may interference with an L1/E1 frequency of the Global Navigation Satellite System (GNSS) due to its second harmonics. In some other examples, an NR band (e.g., N7) may affect navigation and positioning systems of Galileo and the Indian Regional Navigation Satellite System (IRNSS). Additionally, NR transmissions in a frequency band of 4400 MHz to 5000 MHz (e.g., N79 band) may experience IDC interference with a Wi-Fi 5 GHz band spanning 5100 MHz to 5905 MHz.

In some examples, a UE 115 may detect an internal issue or the possibility of the internal issue caused by coexistence related to usage of particular radio resources. As the UE 115 may be unable to resolve the issue by itself, the UE 115 may provide information to the network entity 105 to assist the network entity 105 in restricting radio resource usage to avoid the internal issue (or potential internal issue) created by the coexistence. However, in NR communications systems, such methods, which may be based in a time domain, a frequency domain, or via UE autonomous denials, may fail to support IDC interference mitigation between different RATs (e.g., NR or LTE and Wi-Fi or Bluetooth). For example, the UE 115 may fail to indicate frequencies effected by the interference via an NR FDM solution. Alternatively, while NR TDM solutions may be used for coexistence scenarios in which alternative noninterference frequencies are unavailable and to avoid interference created by simultaneous uplink transmissions on uplink frequencies to a different RAT (e.g., Wi-Fi), the TDM solutions may result in wasted resources and reduced signaling throughput.

Some FDM techniques include changing a BWP or a scheduler configuration based on physical resource blocks (PRBs) to account for IDC interference. However, frequency signaling alone may lead the network entity 105 to avoid using a particular frequency carrier, BWP, PRB set, central frequency and bandwidth, or any other frequency resource indicated by an absolute radio-frequency channel number (ARFCN) at all times even if the actual signaling that is associated with the IDC is very sparse (e.g., Bluetooth audio communications). That is, the UE 115 may inform the network entity 105 to avoid scheduling an entire carrier, BWP, PRB set, central frequency and bandwidth, or any other frequency resource. Additionally, if multiple UEs 115 signal similar information, the network entity 105 may be asked to avoid the frequency resource altogether, which may result in unused frequencies and wasted spectrum, an overloading of other frequency resources that are being used, or both.

Alternatively, using TDM techniques, the network entity 105 may use discontinuous reception (DRX)-based long-term and short-term gaps, multi-universal subscriber entity module (MUSIM) gaps, or HARQ-based gap patterns to mitigate IDC interference. For example, the UE 115 may request that a network entity 105 avoid scheduling transmissions in some timing resources via DRX, MUSIM, or subframe patterns, which may result in high deployment costs. Similar to FDM techniques, using TDM techniques may result in the network entity 105 avoiding transmissions in time periods for an entire frequency band even if IDC interference is triggered from a portion of the PRBs of the frequency band. For example, the network entity 105 may force some DRX patterns that may lead to undesirable (e.g., high) latency due to deploying long cycles or having an active time above a threshold trying to adapt a cycle length to IDC patterns. Alternatively, using MUSIM patterns, the network entity 105 may forgo an entire frequency band for a duration of signaled IDC per a request from a UE 115. Using a subframe-HARQ pattern (e.g., for LTE scenarios), due to a large quantity of potential combinations or patterns that may be used, the UE 115 may signal a quantity of possible patterns at a very high overhead or reduce scheduler flexibility by selecting a particular pattern. In addition, TDM-based IDC mitigation may be difficult to deploy due to mis-synchronization between different RATs (e.g., NR or LTE communications and Wi-Fi or Bluetooth communications).

To reduce the effects of IDC interference on communications between a UE 115 and a network entity 105, the wireless communications system 100 may support an time-frequency IDC indication (e.g., an explicit indication), which may include an indication of IDC interference parameters corresponding to a pattern of IDC interference in a time domain, a frequency domain, or both. In some examples, the UE 115 may transmit UAI indicating a type of IDC interference (e.g., intermodulation between nodes), an interference pattern associated with the interference, or a set of interference parameters associated with the interference pattern in a time or frequency domain, or a combination thereof. The network entity 105 may use the information included in the UAI to determine how to accommodate for (e.g., reduce, prevent, mitigate) the IDC interference while maintaining signaling throughput. In some examples, the network entity 105 may transmit a message to the UE 115 indicating a set of operating parameters the UE 115 is to use during a time period and the set of operating parameters may be based on the type of IDC interference, the interference pattern, the interference parameters, or any combination thereof. The UE 115 may then communicate with the network entity 105 during the time period and using the operating parameters. That is, the network entity 105 may indicate how the UE 115 is to operate during the time period (e.g., a time period in which IDC interference may occur) to mitigate the IDC interference and its effects on communications between the UE 115 and the network entity 105.

Figure 2:
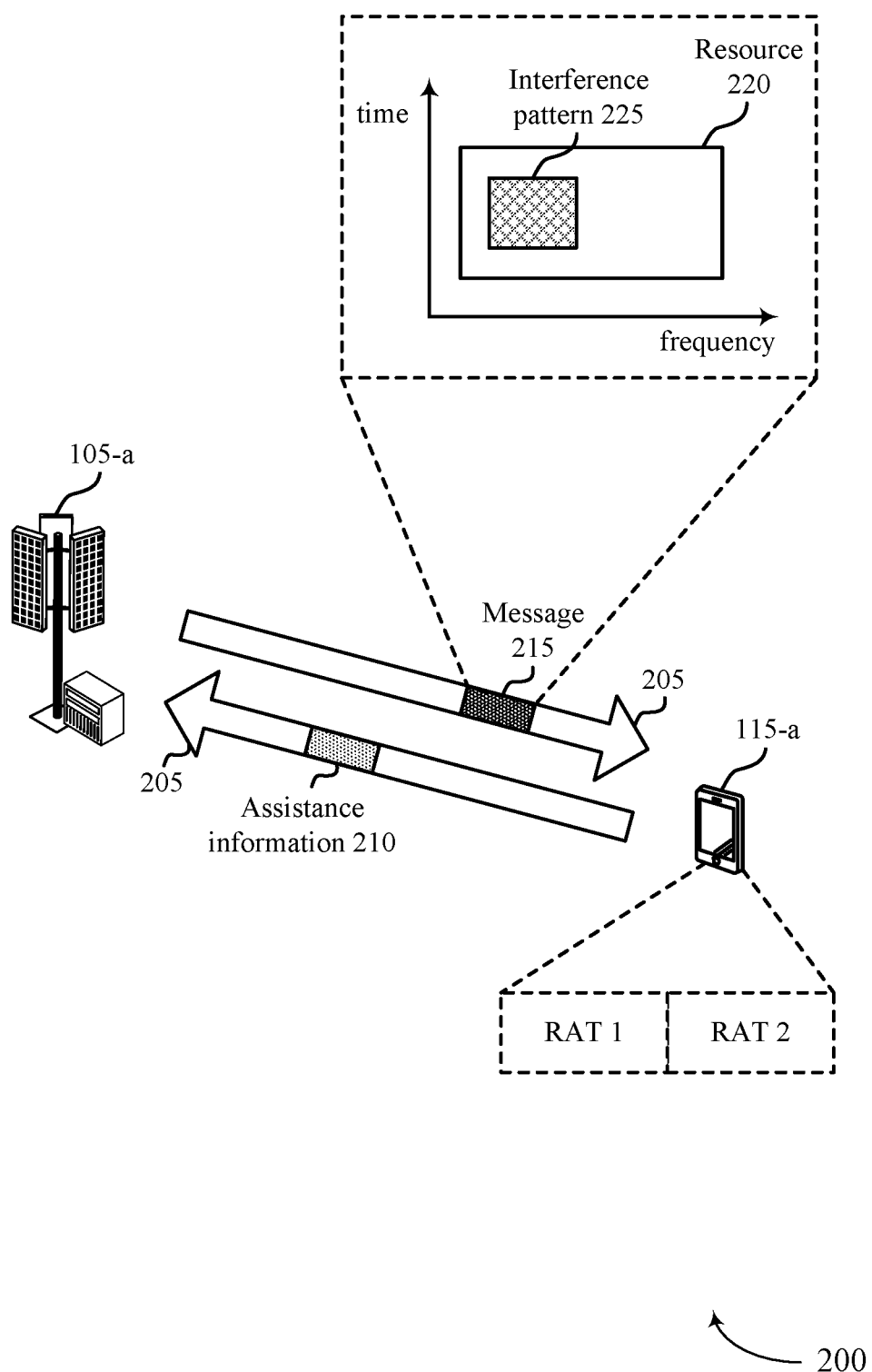
FIG. 2 illustrates an example of a wireless communications system that supports IDC interference parameters in accordance with one or more aspects of the present disclosure.

FIG. 2 illustrates an example of a wireless communications system 200 that supports IDC interference parameters in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. In some examples, the UE 115-a and the network entity 105-a may use information associated with an IDC interference to reduce or mitigate the effects of the IDC interference on communications between the UE 115-a and the network entity 105-a.

The wireless communications system 200 may support communications between the network entity 105-a and the UE 115-a. For example, the network entity 105-a may communicate signals (e.g., uplink and downlink transmissions) with the UE 115-a via respective communication links 205, which may be examples of communication links 125 described with reference to FIG. 1. In some examples, the UE 115-a, the network entity 105-a, or both may support one or more RATs (e.g., RAT 1, RAT 2). For example, the UE 115-a and the network entity 105-a may communicate NR, LTE, Wi-Fi, or Bluetooth transmissions via the communication links 205, among other RATs.

In some cases, based on supporting the one or more RATs, the UE 115-a may experience IDC interference. For example, the UE 115-a may transmit an NR signal and receive a Wi-Fi signal, which may interfere as the transmissions occur on relatively close frequency bands. To reduce or mitigate such interference, the UE 115-a may provide information to the network entity 105-a describing the IDC interference scenario the UE 115-a is experiencing in some detail. Using the information, the network entity 105-a may determine one or more operating parameters the UE 115-a may use to communicate with the network entity 105-a, which may accommodate and mitigate effects of the IDC interference with a minimal effect on signaling throughput (e.g., an NR rate). The UE 115-a may provide such information instead of separately indicating one or more frequency resources that is impacted by the IDC interference (e.g., a carrier frequency, BWP, PRB set, central frequency and bandwidth, or any other frequency resource indicated by an ARFCN) in a frequency domain and a complex gap pattern (e.g., a DRX-based, MUSIM-based, or HARQ-based gap pattern) in a time domain, which may have a minimal impact on the IDC interference, and in some cases, introduce additional system inefficiencies.

The UE 115-a may transmit assistance information 210 (e.g., UAI) associated with the UE 115-a to the network entity 105-a. In some examples, the UE 115-a may transmit the assistance information 210 in a UAI message. The assistance information 210 may indicate a type of IDC interference at the UE 115-a and a set of interference parameters associated with the IDC interference. In some examples, the set of interference parameters may correspond to an interference pattern of the IDC interference in a time domain, a frequency domain, or both. For example, the assistance information 210 may include one or more information elements (e.g., IDCCoexInfo) that each indicate a single type of IDC interference and describing an IDC gap (e.g., the interference pattern) with a set of fields (e.g., the set of interference parameters) having a high granularity (e.g., based on a PRB-level for frequency).

In some examples, the set of interference parameters may indicate a time pattern of the IDC interference (e.g., gap time needs). The UE 115-a may include the set of interference parameters in the assistance information 210 to indicate a time period that communications between the UE 115-a and the network entity 105-a may be impacted by the IDC interference. Put another way, the set of interference parameters may describe the interference pattern such that the network entity 105-a may better reduce or mitigate the IDC interference. For example, the set of interference parameters may include a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof. In addition, the set of interference parameters may include any other parameters that are associated with the interference pattern of the IDC interference in the time domain. In some examples, the UE 115-a may include a subset of the set of interference parameters in the assistance information 210 that describe the type of IDC interference and the interference pattern that the UE 115-a is experiencing. For example, to maintain a low signaling overhead, the UE 115-a may include two parameters associated with the time domain in the set of interference parameters included in the assistance information 210. Alternatively, if signaling overhead is a lesser constraint, and if solving the IDC interference is of a higher priority, the UE 115-a may include more of the parameters in the set of interference parameters included in the assistance information 210.

The periodicity parameter (e.g., a period field) may indicate a periodicity of an occurrence of the IDC interference. For example, the periodicity (e.g., 20 ms) may be based on periodic transmissions that create IDC interference (e.g., Wi-Fi beacons). Alternatively, the periodicity parameter may indicate a start time, an end time, and a duration of the interference pattern. For example, the periodicity parameter may indicate a single, on-demand gap request during which the UE 115-a is to use the one or more operating parameters. The UE 115-a may request that the network entity 105-a configure the time period at a given time, where the gap may not repeat with any periodicity (e.g., having a periodicity of zero). The frame offset parameter (e.g., a frame offset field) may indicate an offset time between a beginning of an NR frame and a beginning of an interfering system frame, which may be calculated with respect to a signaled SFN reference. In such cases, the interfering system may include a Wi-Fi, Bluetooth, or other non-3GPP-based communication received or transmitted by the UE 115-a, which may interfere with a 3GPP-based communication (e.g., NR or LTE signaling) received or transmitted by the UE 115-a. For example, the frame offset parameter may indicate an offset between an beginning of an NR frame and a beginning of a Wi-Fi frame.

Additionally, or alternatively, the time offset parameter (e.g., an offset field) may indicate a time between a beginning of an interfering system frame and a beginning of an actual transmission that created the IDC interference (e.g., a Wi-Fi or Bluetooth transmission or reception at the UE 115-a). For example, a Wi-Fi frame may begin at a time according to the frame offset parameter, however a Wi-Fi transmission that creates the IDC interference may begin at a later time. In some cases, the offset uncertainty parameter (e.g., an offset uncertainty field) may be included in the set of interference parameters if there is some uncertainty as to when the interference pattern begins (e.g., due to some listen-before-talk (LBT) procedure in the interfering system being transmitted or received). The duration parameter (e.g., a duration field) may indicate a time duration of the IDC interference (e.g., a length of the interference pattern in time). Additionally, or alternatively, the start time parameter (e.g., a flexible start time field) may be included in the set of interference parameters if a start time of a transmission that creates the IDC interference has some flexibility. In such cases, the UE 115-a may indicate to the network entity 105-a that the interference pattern and a time period indicated by the network entity 105-a during which the UE 115-a may use one or more operating parameters based on the IDC interference may occur anywhere within the flexible start time. That is, an interfering system (e.g., Wi-Fi, Bluetooth) may have a flexible start time that may accommodate an NR or LTE transmission to avoid IDC interference.

A power parameter (e.g., a power max field) may be included in the set of interference parameters when the UE 115-a may refrain from stopping all communications during a time period of the IDC interference, but rather may cap its transmit power during the time period to maintain the IDC interference below an acceptable level. In some examples, the set of interference parameters may include an interference direction parameter (e.g., an interference direction field) that may indicate whether an NR communication is creating IDC interference, effected by IDC interference from another source, or both. Additionally, or alternatively, the system type parameter (e.g., a victim_system_type field) may indicate a list of victim system types to which the IDC interference is caused from an NR communication when the UE 115-a is configured for uplink CA. In some examples, the list of victim system types may include a type of GNSS, such as GPS, Global Navigation Satellite System (GLONASS), BeiDou Navigation Satellite System (BDS), Galileo, and Indian Regional Navigation Satellite System (IRNSS) (or NavIC), wireless local area network (WLAN), Bluetooth, or any combination thereof.

In some examples, the set of parameters may include the optional system protocol parameter (e.g., a victim_system_protocol field), which may indicate an IDC-specific protocol the UE 115-a may attempt to avoid interfering with. For example, some interference with Bluetooth communications may be based on an extended synchronous connection oriented (eSCO) protocol, a scenario in which the UE 115-a may either signal a large quantity of possible TDD patterns that may accommodate the eSCO protocol, which may be associated with a high overhead, or the UE 115-a may attempt to avoid interference with the eSCO protocol and the network entity 105-a may use other interference parameters to understand the interference pattern.

In some examples, the set of interference parameters may indicate frequency resources that may be effected by the IDC interference (e.g., at a PRB-level of granularity). For example, the set of interference parameters may include a BWP parameter, a PRB set parameter, a center frequency parameter, a bandwidth parameter, a dual connectivity (DC) parameter, or any combination thereof. In addition, the set of interference parameters may include any other parameters that are associated with the interference pattern of the IDC interference in the frequency domain. In some examples, the set of interference parameters may include some combination of interference parameters that are associated with the interference pattern in the time domain and the frequency domain.

In some cases, the BWP parameter (e.g., a BWP_ID field) may indicate an ith identifier of a BWP that is effected by the IDC interference. The PRB set parameter (e.g., a PRB start field) may indicate a first PRB of a PRB set in which the IDC interference occurs. Additionally, or alternatively, the bandwidth parameter (e.g., a PRB bandwidth field) may indicate a bandwidth (e.g., in PRBs) of the IDC interference. That is, the bandwidth parameter may indicate a frequency bandwidth in which the IDC interference occurs. In some examples, the set of interference parameters may include one or more of the frequency parameters such that the UE 115-a reports a frequency in terms of an absolute frequency and a bandwidth, or some other combination of frequency resources (e.g., the frequency parameters may include a BWP parameter and a PRB parameter or a frequency value and bandwidth indicated in an ARFCN).

The DC parameter (e.g., a DCCaused field) may indicate if the reported IDC interference is caused by intermodulation between a master node (MN) (e.g., a master gNB (MbNG)) and a secondary node (SN) (e.g., a secondary gNB (SgNB)), in a DC scenario. Additionally, the UE 115-a may indicate one or more fields associated with the DC parameter that indicates which frequency pairing may be causing the IDC interference. For example, the DC parameter may include an SNCarrierFreqList field that indicates a list of SN carrier frequencies, BWPs, or PRB sets at the SN creating the intermodulation interference. If the UE 115-a includes the SNCarrierFreqList field in a report to the SN, the field may indicate a problematic carrier frequency, BWP, or PRB set to the MN. In some cases, the DC parameter may include an affectedDCCarrierCombinationList field that indicates one or more carrier band combinations that may create the intermodulation interference. Additionally, or alternatively, the DC parameter may include a CellID field that indicates an identifier of a cell that may create the intermodulation interference.

In some examples, the network entity 105-a may use the information indicated in the assistance information 210 to determine one or more operating parameters that the UE 115-a and the network entity 105-a may use to communicate during periods of IDC interference. The UE 115-a may receive a message 215 indicating the one or more operating parameters associated with a time period that is based on the interference pattern. That is, the interference pattern may occur at least partially during the time period. The one or more operating parameters may be based on the type of IDC interference, the set of interference parameters, and the interference parameters.

The operating parameters may include some pattern the UE 115-a may use during the time period to reduce or mitigate the IDC interference based on the interference parameters. For example, the network entity 105-a may determine a TDD pattern, a DRX pattern, an explicit gap pattern, or any combination thereof to accommodate the IDC interference while maintaining a high signaling throughput (e.g., an NR rate). In some examples, the UE 115-a and the network entity 105-a may communicate during the time period based on the one or more operating parameters, which may include the TDD parameter, the DRX parameter, the explicit gap pattern, or any combination thereof. For example, the UE 115-a and the network entity 105-a may communicate using a resource 220 (e.g., a time-frequency resource). The UE 115-a may experience IDC interference during the resource 220, which may be associated with an interference pattern 225. During the time period that is based on the interference pattern 225, the network entity 105-a and the UE 115-a may employ the one or more operating parameters to reduce the effects of the IDC interference during the resource 220. In addition, the network entity 105-a may configure the operating parameters in such a way that the UE 115-a may use the operating parameters for a portion of a frequency band and a period of time of the resource 220 during only the time period associated with the interference pattern 225 (e.g., rather than for the entire resource), which may maintain a high signaling throughput and improve resource utilization efficiency.

In some cases, the wireless communications system 200 may support NR-DC or EN-DC deployments, where the UE 115-a may detect IDC interference created by intermodulation or harmonic interference between an MN (e.g., an MgNB) and an SN (e.g., an SgNB). The UE 115-a may transmit information about the intermodulation interference to the MN and the SN (e.g., via UAI), where a set of interference parameters associated with the intermodulation interference may include a DC parameter (e.g., a DCCaused field) and its related fields, indicating that the intermodulation interference is created by DC communications between the MN and the SN. That is, the UE 115-a may transmit the assistance information 210 (e.g., in a UAI message) that indicates a frequency intermodulation between the MN and the SN, where the IDC interference is based on the frequency intermodulation.

In some examples, the UE 115-a may communicate with a non-terrestrial device (e.g., a satellite), for example, using GNSS. In GNSS, each bit transmitted in a signal (e.g., a GPS signal) may be generated using a direct sequence spread spectrum (DSSS) over a few tens of milliseconds (e.g., a 20 ms bit period for GPS signals). GNSS transmissions may use some amount of interference-free time each bit period depending on a phase of the UE 115-a, a GNSS receiver (e.g., acquisition, tracking phase). No portion of the bit period may be more favored than another. If the UE 115-a has a sufficient percentage of interference-free time in each bit period, then the UE 115-a may recover a GNSS signal (e.g., a GPS signal) and resolve any IDC interference that may be occurring at the UE 115-a.

In some examples, the UE 115-a may resolve IDC interference for communications with a non-terrestrial device (e.g., in a GNSS signaling scenario) based on the start time parameter, the duration parameter, and the time offset parameter included in the set of interference parameters. For example, the UE 115-a may transmit the assistance information 210 indicating a bit period interference at a non-terrestrial device and indicating the set of interference parameters including at least the start time parameter (e.g., 20 ms/20 ms—Duration, as the interference-free time may be at any time during a period), the duration parameter (e.g., required interference-free time), and the time offset parameter (e.g., 0 ms), a periodicity parameter (e.g., 20 ms), a frame offset parameter (e.g., 0 ms), an interference direction parameter (e.g., indicated as "other" as the GNSS is effected by NR, but not vice versa), a system type parameter (e.g., GNSS), or any combination thereof. The set of interference parameters may correspond to an interference pattern of the bit period interference in the time domain and the frequency domain.

In some cases, the UE 115-a may receive control signaling (e.g., via the message 215) indicating a phase associated with a bit period for communicating with the non-terrestrial device based on the bit period interference, the start time parameter, the duration parameter, and the offset parameter. Based on the start time parameter (e.g., indicating a flexible start time) in particular, the phase may provide the UE 115-a some amount of down time (e.g., interference-free time) in each bit period so that the UE 115-a may recover enough power to decode a GNSS signal. Thus, the UE 115-a may communicate with the non-terrestrial device during the time period and based on the phase, which may enable the UE 115-a to have a sufficient percentage of interference-free time for the communications.

By determining a set of operating parameters for communicating in an IDC interference scenario based on a type of the IDC interference and an interference pattern associated with the IDC interference, communications between the network entity 105-a and the UE 115-a may be improved. For example, communicating using the operating parameters as described herein may reduce signaling overhead, while maintaining a latency and an active time associated with communications between the network entity 105-a and the UE 115-a. Additionally, the described techniques may reduce the amount of wasted resources in the frequency domain, which may support low latency communications. In addition, the UE 115-a may use more of a given carrier frequency, BWP, PRB set, central frequency and bandwidth, or any other frequency resource based on which frequency bands are impacted by IDC interference, which may improve resource utilization efficiency and increase signaling throughput.

Figure 3:
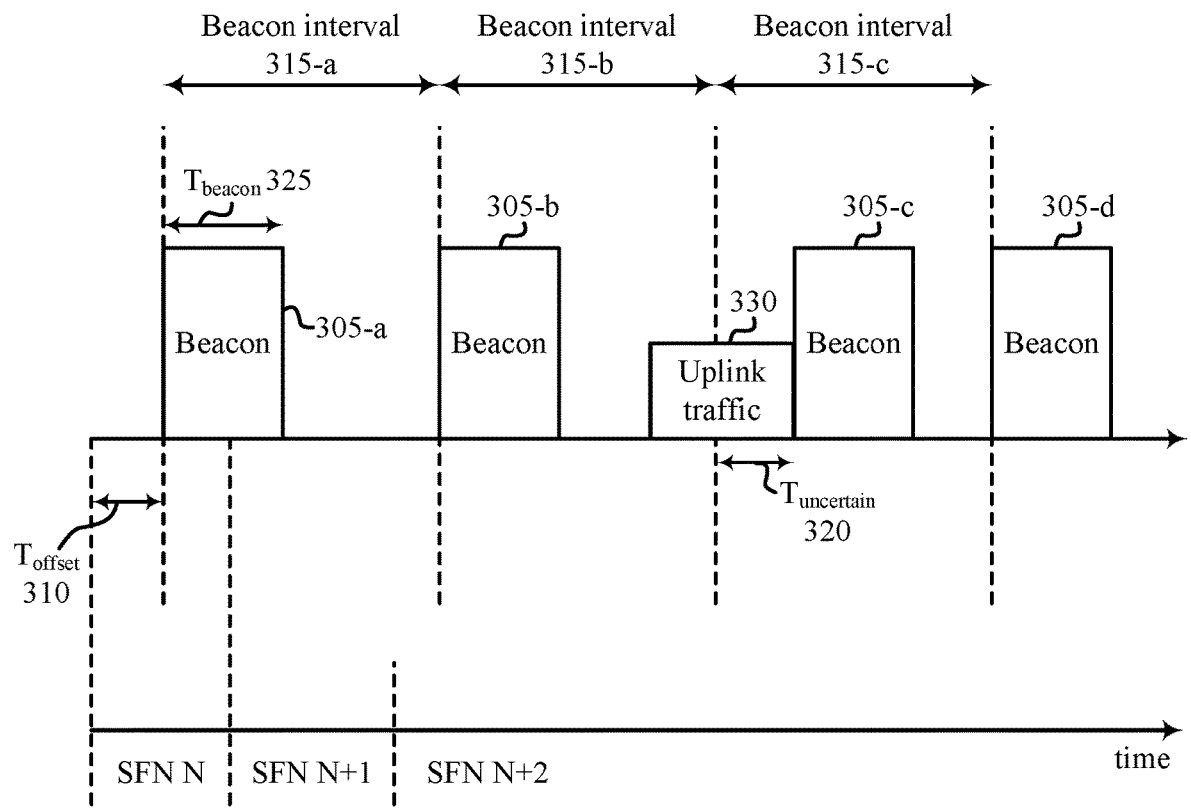
FIG. 3 illustrates an example of a Wi-Fi transmission pattern that supports IDC interference parameters in accordance with one or more aspects of the present disclosure.

FIG. 3 illustrates an example of a Wi-Fi transmission pattern 300 that supports IDC interference parameters in accordance with one or more aspects of the present disclosure. In some examples, the Wi-Fi transmission pattern 300 may implement aspects of the wireless communications systems 100 and 200 or may be implemented by aspects of the wireless communications systems 100 and 200. For example, a UE and an access point, which may be an example of a network entity as described herein, may communicate a set of Wi-Fi beacons according to the Wi-Fi transmission pattern 300, which may account for IDC interference created by the Wi-Fi beacons and other transmissions (e.g., NR or LTE transmissions).

In some examples, an access point may transmit a beacon 305 (e.g., or another Wi-Fi transmission) once each 100 transmission units. Each transmission unit may span a time period of 1.024 ms, resulting in a beacon interval 315 (e.g., a beacon transmission interval) of 102.4 ms. In addition, a transmission of a beacon 305 may span several milliseconds (e.g., $T_{beacon}$ 325). In some examples, a UE may experience IDC interference created by receiving the beacons 305 and transmitting LTE communications. In some examples, the access point may delay beacon transmissions if a channel is busy to avoid IDC interference. In turn, the UE may miss some of the beacon transmissions. However, if the reception of a beacon 305 at least partially collides with an uplink LTE transmission, the beacon reception may be considered as having failed. Accordingly, the UE and the access point may use DRX adaptation to prevent excessive collisions (e.g., interference) between transmission of uplink LTE communications and reception of beacons 305 by the UE.

To receive the beacons 305 and transmit LTE communications with minimal impact from IDC interference, the UE may transmit assistance information (e.g., UAI) to the access point indicating uplink traffic 330 at the UE, which may interfere with reception of the beacons 305. In addition, the assistance information may indicate a set of interference parameters associated with the uplink traffic 330, where the set of interference parameters may correspond to an interference pattern of the uplink traffic 330 in a time domain and in a frequency domain.

In some examples, the set of interference parameters may include a PRB set parameter that indicates a PRB set affected by Wi-Fi interference from the beacons 305 (e.g., interference associated with a second harmonic of the beacon transmissions). In addition, the set of interference parameters may include one or more time-domain based parameters, which may include a SFN parameter, a periodicity parameter, a frame offset parameter, a time offset parameter, an offset uncertainty parameter, a duration parameter, an interference direction parameter, a system type parameter, or any combination thereof. The SFN parameter may indicate a SFN of #N, #N+1, or #N+2 which may represent a reference point between the UE and the access point. The periodicity parameter may indicate a period of 1024 ms, and the frame offset parameter may indicate a frame offset of $T_{offset}$ 310, which may represent an offset from the beginning of the interference pattern to the reception of a beacon 305-a at a beginning of a beacon interval 315-a. In addition, the offset parameter may indicate an offset of 0 ms between the reception of the beacon 305-a and the beacon interval 315-a, and the offset uncertainty parameter may indicate an uncertainty of $T_{uncertain}$ 320 between a beginning of a beacon interval 315 and reception of a beacon 305 within the beacon interval 315. The duration parameter may indicate a duration of interference as $T_{beacon}$ 325 (e.g., the duration of a beacon transmission). The interference direction parameter may indicate that the IDC interference is created by a beacon reception and an LTE transmission (e.g., indicated as "other"), and the system type parameter may indicate a victim_system_type of WLAN (e.g., LTE communications).

Based on the set of interference parameters indicated by the UE, the access point may determine a set of operating parameters associated with a time period corresponding to the interference pattern. The UE and the access point may communicate using the operating parameters to mitigate interference between the UE receiving the beacons 305 and transmitting LTE communications. For example, after the $T_{offset}$ 310 and during an SFN #N and an SFN #N+1, the UE may receive a beacon 305-a during a beacon interval 315-a. The UE may receive the beacon 305-a over the time period $T_{beacon}$ 325. In addition, the UE may receive a beacon 305-b during a beacon interval 315-b, where a beginning of the beacon interval 315-b and the reception of the beacon 305-b are collocated (e.g., associated with an offset of 0 ms) in a SFN #N+2. In some cases, the UE may receive a beacon 305-c during a beacon interval 315-c. In this case, due to uplink traffic 330 scheduled at the beginning of the beacon interval 315-c, the operating parameters may indicate that the UE is to receive the beacon 305-c after $T_{uncertain}$ 320 to refrain from interfering with the uplink traffic 330 that is currently occupying the beacon interval 315-c. That is, the UE may receive control signaling indicating to delay reception of the beacon 305-c until after $T_{uncertain}$ 320 based on the uplink traffic 330, the set of interference parameters, and the interference pattern. As such, the UE may receive the beacon 305-c after the uplink traffic 330 making the channel busy. In some examples, the UE may then receive a beacon 305-d or any other quantity of beacons 305 according to the operating parameters.

Figure 4:
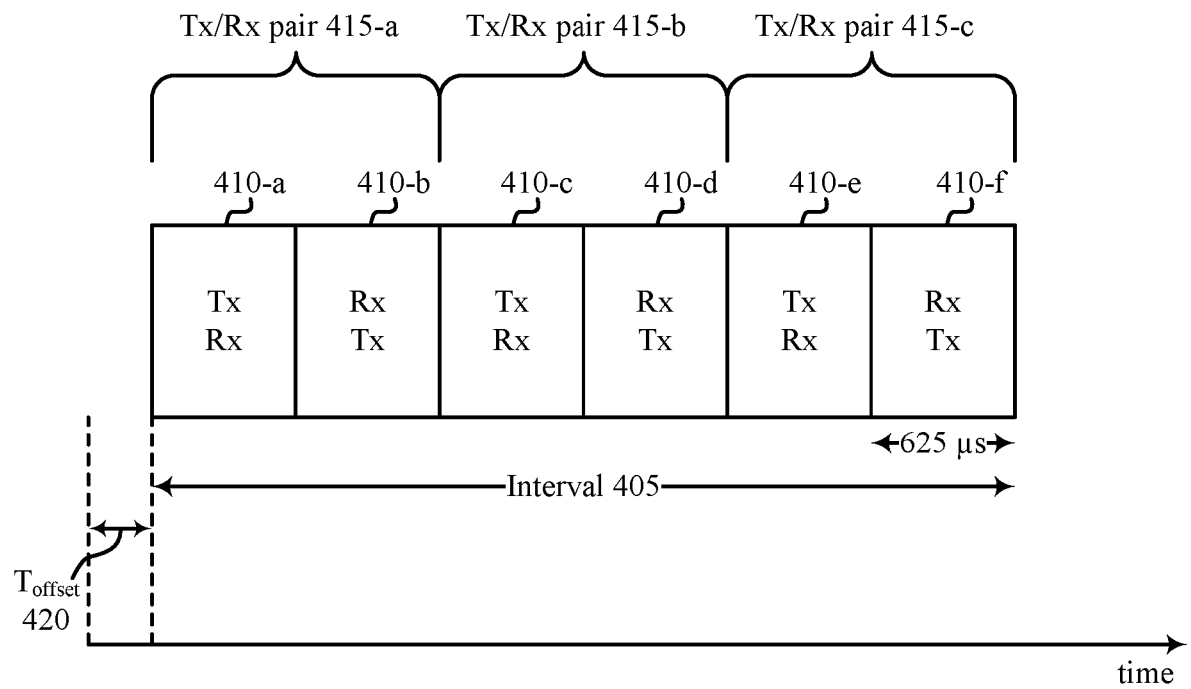
FIG. 4 illustrates an example of a Bluetooth transmission pattern that supports IDC interference parameters in accordance with one or more aspects of the present disclosure.

FIG. 4 illustrates an example of a Bluetooth transmission pattern 400 that supports IDC interference parameters in accordance with one or more aspects of the present disclosure. In some examples, the Bluetooth transmission pattern 400 may implement aspects of the wireless communications systems 100 and 200 or may be implemented by aspects of the wireless communications systems 100 and 200. For example, a UE and an network entity may communicate Bluetooth and NR or LTE transmissions according to the Bluetooth transmission pattern 400, which may account for IDC interference created between the Bluetooth and NR or LTE communications.

In some cases, the UE and the network entity may communicate using NR or LTE and Bluetooth coexistence, where the Bluetooth communications are in accordance with an eSCO protocol. In an NR or LTE and Bluetooth (eSCO) coexistence scenario, a time period allocated to deliver a packet in an eSCO mode may be referred to as an eSCO interval 405. In some examples, an eSCO interval 405 may be six slots 410 (e.g., 625 μs×6 slots=3.75 ms), and a quantity of packet transmissions within the eSCO interval 405 may be three (e.g., three transmit/receive (Tx/Rx) pairs 415). Within a slot 410, the UE may transmit and receive either a Bluetooth or NR or LTE communication. As such, two consecutive slots 410 may represent a Tx/Rx pair 415, where a first slot 410 in the Tx/Rx pair 415 may include an NR or LTE transmission and a Bluetooth reception and a second slot 410 in the Tx/Rx pair 415 may include a Bluetooth transmission and an NR or LTE reception, or vice versa.

Whether the UE receives or transmits a Bluetooth or NR or LTE transmission may depend on whether the UE operates as a master device or a slave device for the Bluetooth communications. For example, if Bluetooth communication is associated with a master device, the eSCO interval 405 may begin with a transmit slot followed by a receive slot, and if the Bluetooth communication is associated with a slave device, the eSCO interval 405 may begin with a receive slot followed by a transmit slot. That is, in a given Tx/Rx pair 415, a master device may transmit or receive before a slave device. In the example of FIG. 3, the eSCO interval 405 may include a Tx/Rx pair 415-a, a Tx/Rx pair 415-b, and a Tx/Rx pair 415-c, which each may include a transmit slot and a receive slot. The Tx/Rx pair 415-a may include a slot 410-a (e.g., a transmit slot) and a slot 410-b (e.g., a receive slot). The slot 410-a may be a transmit slot for the master device and a receive slot for the slave device, and the slot 410-b may be a receive slot for the master device and a transmit slot for the slave device. Similarly, the Tx/Rx pair 415-b may include a slot 410-c, which may be a transmit slot for the master device and a receive slot for the slave device, and a slot 410-d, which may be a receive slot for the master device and a transmit slot for the slave device. In addition, the Tx/Rx pair 415-c may include a slot 410-e, which may be a transmit slot for the master device and a receive slot for the slave device, and a slot 410-f, which may be a receive slot for the master device and a transmit slot for the slave device.

If a network entity fails to deliver a packet during the eSCO interval 405, the packet may be dropped and the network entity may transmit a new packet in a retransmission window (e.g., WeSCO=4). In a situation in which the Bluetooth communications are associated with a master device, the UE may control a local clock to align timelines of Bluetooth and NR or LTE transmissions to avoid conflicts and reduce interference. Alternatively, if the Bluetooth communications are associated with a slave device, a remote master device may control a timeline of the Bluetooth transmissions, and thus, depending on an offset between timelines of the Bluetooth and NR or LTE transmissions at a given point in time, the Bluetooth transmission pattern 400 may lack a clean Tx/Rx pair 415 in an eSCO interval 405. Therefore, the UE may provide information about the coexistence scenario between the Bluetooth and NR or LTE communications to the network entity to ensure that at least one clean Tx/Rx pair 415 is communicated in each eSCO interval 405.

The UE may transmit assistance information (e.g., UAI) indicating an eSCO-based interference (e.g., interference between Bluetooth and NR or LTE transmissions) and indicating a set of interference parameters which correspond to an interference pattern of the interference in the time domain and the frequency domain. In some examples, the set of interference parameters may include a PRB set parameter that indicates a PRB set affected by the interference (e.g., interference associated with a second harmonic of the Bluetooth transmissions). In addition, the set of interference parameters may include one or more time-domain based parameters, which may include a periodicity parameter, a frame offset parameter, a time offset parameter, a duration parameter, an interference direction parameter, a system type parameter, a start time parameter, or any combination thereof.

The periodicity parameter may indicate the eSCO interval 405 (e.g., a periodicity of 3.75 ms), and the frame offset parameter may indicate a frame offset of $T_{offset}$ 420, which may represent an offset from the beginning of the interference pattern to the slot 410-a (e.g., a first slot with the eSCO interval 405). In addition, the offset parameter may indicate an offset of 0 ms between the slot 410-a and the beginning of the eSCO interval 405 (e.g., a beginning of the slot 410-a and a beginning of the eSCO interval 405 may be collocated). In some examples, the duration parameter may indicate a duration of interference, which may be equal 625 μs (e.g., the duration of a slot 410 in time). The interference direction parameter may indicate that the interference is created from both Bluetooth communications and NR or LTE communications (e.g., indicated as "both"), and the system type parameter may indicate a victim_system_type as Bluetooth (e.g., Bluetooth communications are impacted by the interference). Additionally, the start time parameter may indicate a flexible start time of 3.215 ms. That is, if the master device is associated with LTE communications, the UE may have some flexibility regarding where to transmit and receive a frame, so the UE may provide the network entity with a flexible indication and accordingly adjust a Bluetooth transmission.

Based on receiving the indication of the set of interference parameters, the network entity may determine one or more operating parameters associated with a time period, which the UE may use for Bluetooth and NR or LTE communications to reduce or mitigate the interference. For example, the UE may receive control signaling from the network entity indicating the eSCO interval 405 including the Tx/Rx pairs 415 (e.g., at least one transmit slot and one receive slot), and indicating a start time of the eSCO interval 405 based on the interference, the set of interference parameters, and the interference pattern. Based on the start time parameter indicating a flexible start time of 3.125 ms, which is calculated as the time duration of the eSCO interval 405 (e.g., 3.75 ms) minus a time duration of a slot 410 (e.g., 625 μs), the operating parameters may enable the UE to adjust a Bluetooth transmission such that at least one Tx/Rx pair 415 is transmitted successfully during the eSCO interval 405. As such, the UE may transmit and receive Bluetooth communications during the eSCO interval 405 with limited interference.

In some other examples, the set of interference parameters may include a PRB set parameter that indicates a PRB set affected by the interference (e.g., interference associated with a second harmonic of the Bluetooth eSCO transmissions). In addition, the set of interference parameters may include one or more time-domain based parameters. The time-domain based parameters may include a periodicity parameter which may indicate the eSCO interval 405 (e.g., a periodicity of 3.75 ms), a frame offset parameter which may indicate the $T_{offset}$ 420, a time offset parameter which may indicate an offset of 0 ms between the beginning of the slot 410-a and the beginning of the eSCO interval 405, an interference direction parameter which may indicate that the interference is created from both Bluetooth eSCO communications and NR or LTE communications (e.g., indicated as "both"), a system type parameter which may indicate a victim_system_type as Bluetooth (e.g., Bluetooth communications are impacted by the interference), and a system protocol parameter (e.g., a victim_system_protocol field) which may indicate a victim system protocol as eSCO.

Based on the periodicity (e.g., the eSCO interval 405 spanning 3.75 ms) and the victim system protocol (e.g., eSCO) included in the set of interference parameters, the network entity may determine one or more operating parameters for the UE to use during the eSCO interval 405 (e.g., the network entity may create an accurate gap pattern).

Figure 5:
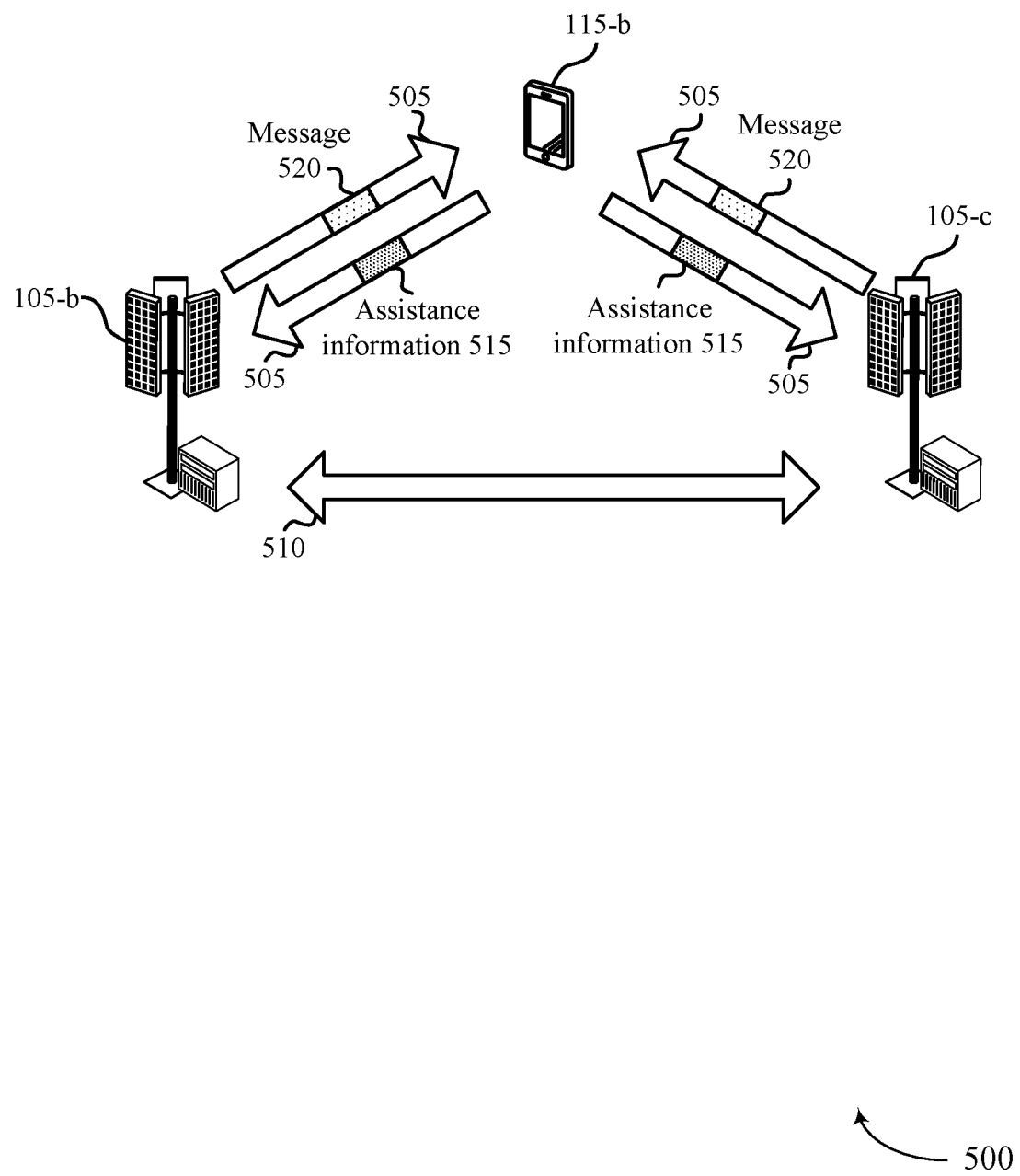
FIG. 5 illustrates an example of a wireless communications system that supports IDC interference parameters in accordance with one or more aspects of the present disclosure.

FIG. 5 illustrates an example of a wireless communications system 500 that supports IDC interference parameters in accordance with one or more aspects of the present disclosure. In some examples, the wireless communications system 500 may implement aspects of the wireless communications systems 100 and 200 or may be implemented by aspects of the wireless communications systems 100 and 200. For example, the wireless communications system 500 may include a UE 115-b, a network entity 105-b, and a network entity 105-c, which may be examples of corresponding devices described herein. In some examples, the network entity 105-b may be a master network entity (e.g., an MgNB, an MN), and the network entity 105-c may be a secondary network entity (e.g., an SgNB, an SN). The wireless communications system 500 may support MR-DC communications, including EN-DC and NR-DC scenarios.

The wireless communications system 500 may support communications between the UE 115-b, the network entity 105-b, and the network entity 105-c. For example, the UE 115-a may receive communications from the network entities via respective communication links 505, which may be examples of communication links 125 described with reference to FIG. 1 (e.g., Uu communication links). In addition, the network entity 105-b and the network entity 105-c may communicate via a communication link 510, which may be an example of an Xn interface link.

In some examples, the UE 115-b may experience IDC interference because of the multi-network entity scenario (e.g., a CA scenario) in the wireless communications system 500, where the IDC interference is created because of the communications between the network entity 105-b and the network entity 105-c. To reduce or mitigate the interference, the UE 115-b may transmit respective assistance information 515 (e.g., UAI) to the network entities 105 indicating a frequency intermodulation interference between the network entity 105-b and the network entity 105-c (e.g., a type of IDC interference the UE 115-b is experiencing). In addition, the interference information may indicate a set of interference parameters which may correspond to an interference pattern of the frequency intermodulation interference in a time domain and a frequency domain.

The set of interference parameters may include one or more frequency-domain based parameters, which may indicates one or more frequencies effected by the frequency intermodulation interference between the network entity 105-b and the network entity 105-c. The frequency-domain based parameters may also include a DC parameter (e.g., a DCCaused field indicating "yes"), which may indicate that the frequency intermodulation interference is created by the network entity 105-b and the network entity 105-c in a DC scenario. The DC parameter may include an SNCarrierFreqList field that indicates a list of frequencies creating the frequency intermodulation interference. In addition, the set of interference parameters may include one or more time-domain based parameters, which may indicate time needs (e.g., gap time needs) of the IDC interfering technology created by the DC. That is, the time-domain based parameters may described a pattern of the frequency intermodulation interference in the time domain.

The UE 115-*b* may transmit the respective assistance information 515 indicating the set of interference parameters to the network entity 105-*b* or the network entity 105-*c* in a CA deployment, which may trigger the network entities to change any problematic frequencies or ensure a sufficient time gap between simultaneous usage of the network entities 105 to avoid creating the frequency intermodulation interference. That is, the UE 115-*b* may prevent the network entities 105 from communicating with the UE 115-*b* simultaneously. Accordingly, the network entity 105-*b* and the network entity 105-*c* may coordinate the assistance information 515 and one or more operating parameters determined based on the assistance information 515 via the Xn interface.

The UE 115-*b* may receive control signaling from the network entity 105-*b* or the network entity 105-*c* indicating the one or more operating parameters associated with a time period that is based on the frequency intermodulation interference and the DC parameter. For example, the one or more operating parameters may indicate when each network entity 105-*b* is to communicate with the UE 115-*b* such that they refrain from performing simultaneous communications. The UE 115-*b* may receive one or more messages 520 from the network entity 105-*b*, the network entity 105-*c*, or both during the time period based on the one or more operating parameters, such that the UE 115-*b* may maintain signaling throughput while limiting the effects of the frequency intermodulation interference.

Figure 6:
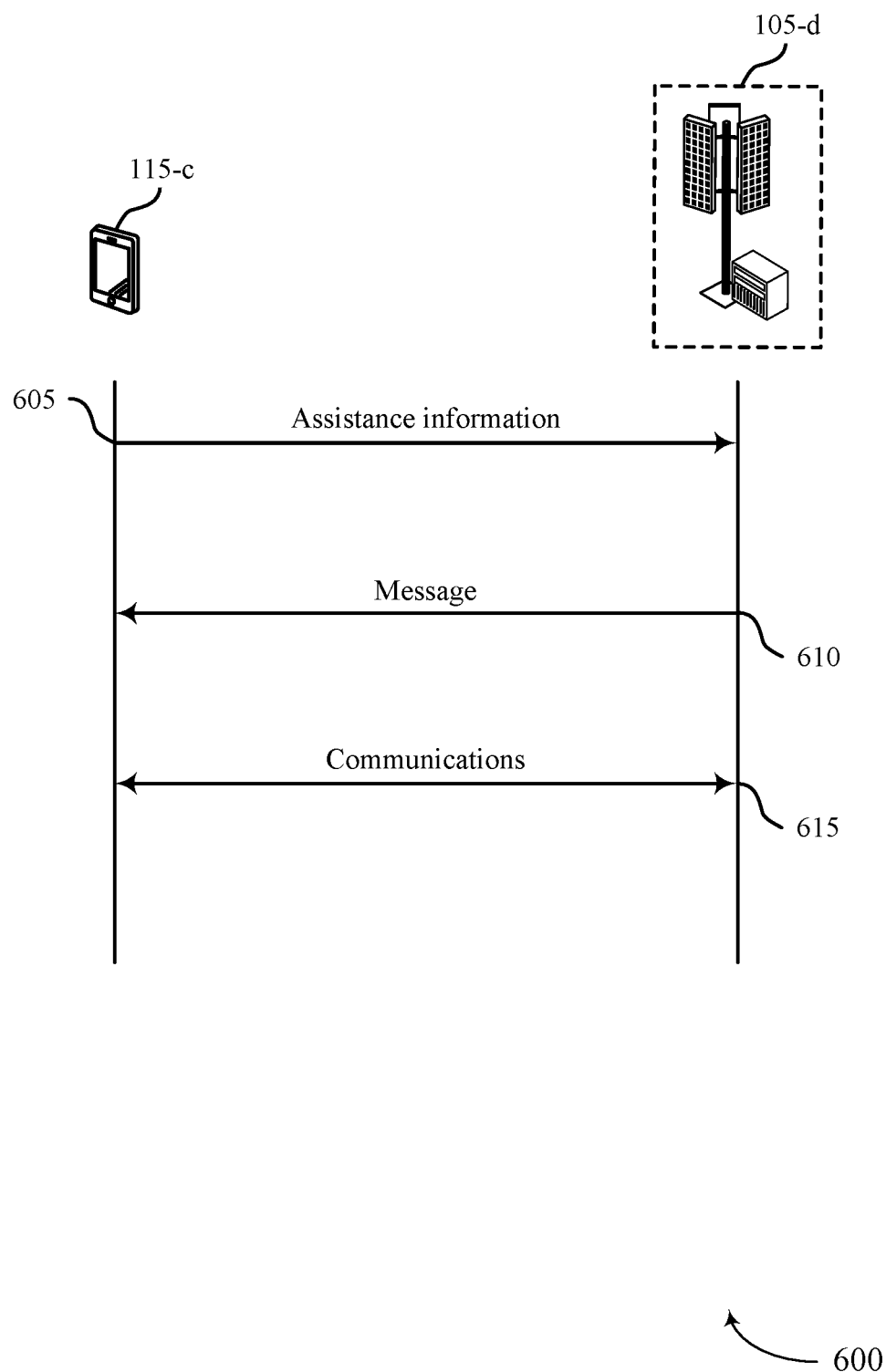
FIG. 6 illustrates an example of a process flow that supports IDC interference parameters in accordance with one or more aspects of the present disclosure.

FIG. 6 illustrates an example of a process flow 600 that supports IDC interference parameters in accordance with one or more aspects of the present disclosure. The process flow 600 may implement aspects of wireless communications systems 100 and 200, or may be implemented by aspects of the wireless communications systems 100 and 200. For example, the process flow 600 may illustrate operations between a UE 115-*c* and a network entity 105-*d*, which may be examples of corresponding devices described herein. In the following description of the process flow 600, the operations between the UE 115-*c* and the network entity 105-*d* may be transmitted in a different order than the example order shown, or the operations performed by the UE 115-*c* and the network entity 105-*d* may be performed in different orders or at different times. Some operations may also be omitted from the process flow 600, and other operations may be added to the process flow 600.

At 605, the UE 115-*c* may transmit, to the network entity 105-*d*, assistance information associated with the UE 115-*c*, the assistance information indicating a type of IDC interference at the UE 115-*c* and indicating a set of interference parameters associated with the IDC interference, where the set of interference parameters corresponds to an interference pattern of the IDC in a time domain, a frequency domain, or both. In some examples, the IDC interference may be created by communications associated with different RATs, including NR, LTE, Bluetooth, Wi-Fi, and GPS communications, among other RATs. In some examples, the interference pattern may describe a pattern of the IDC interference in the time domain, the frequency domain, or both.

At 610, the UE 115-*c* may receive, from the network entity 105-*d*, a message indicating one or more operating parameters associated with a time period that is based on the interference pattern, the one or more operating parameters based on the type of IDC interference, the set of interference parameters, and the interference pattern. In some examples, the one or more operating parameters may include a TDD pattern, a DRX pattern, an explicit gap pattern, or any combination thereof the UE 115-*c* may employ for communications with the network entity 105-*d* to reduce or mitigate the IDC interference.

At 615, the UE 115-*c* may communicate with the network entity 105-*d* during the time period based on the one or more operating parameters. For example, the UE 115-*c* may communicate with the network entity 105-*d* using the TDD pattern, the DRX pattern, the explicit gap pattern, or some other pattern configured by the network entity 105-*d*, which may reduce or mitigate the IDC interference while maintaining signaling throughput.

Figure 7:
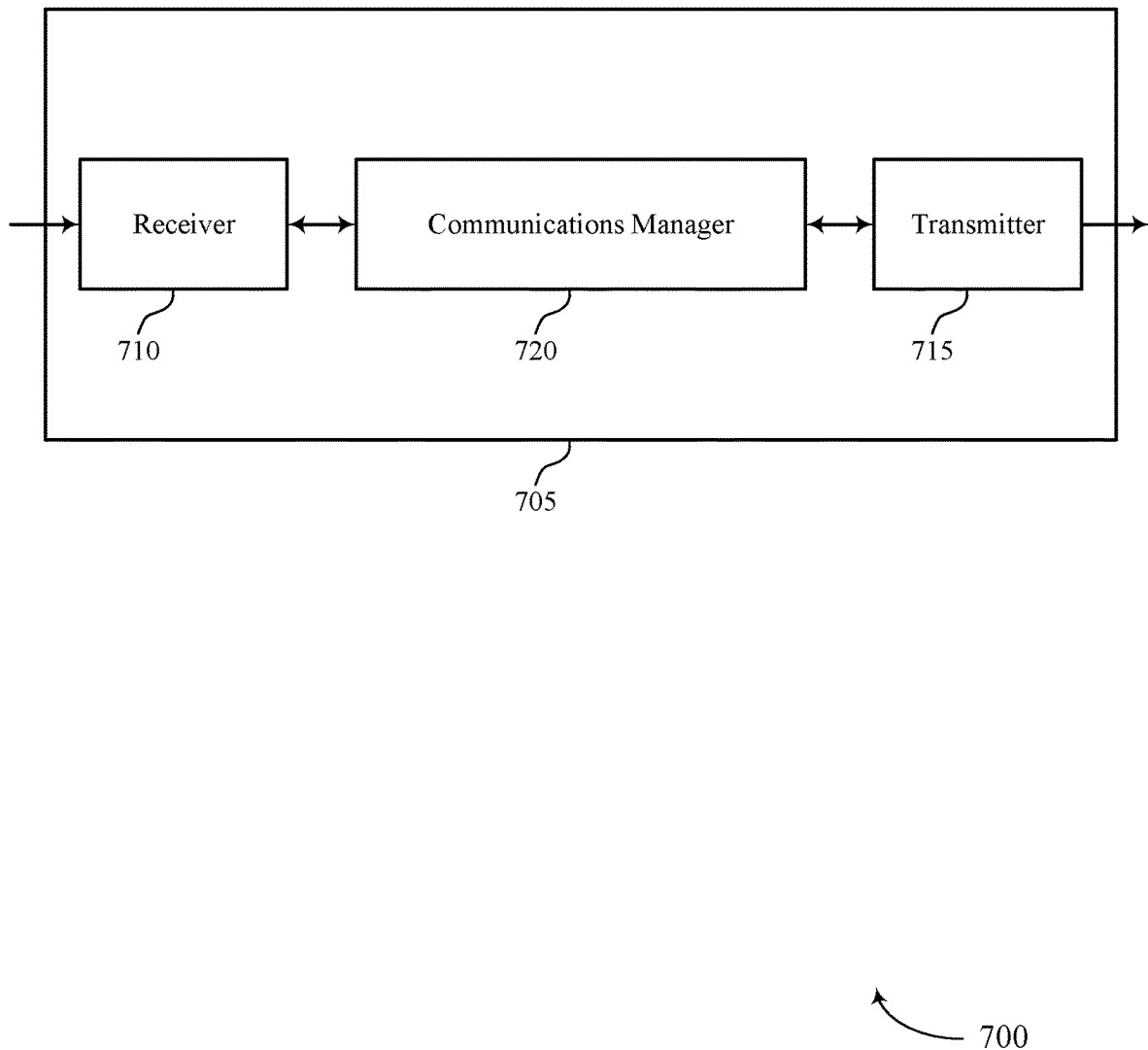
FIGS. 7 and 8 show block diagrams of devices that support IDC interference parameters in accordance with one or more aspects of the present disclosure.

FIG. 7 shows a block diagram 700 of a device 705 that supports IDC interference parameters in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to IDC interference parameters). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to IDC interference parameters). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of IDC interference parameters as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The communications manager 720 may be configured as or otherwise support a means for receiving a message indicating one or more operating parameters associated with a time period that is based on the interference pattern, the one or more operating parameters based on the type of IDC interference, the set of interference parameters, and the interference pattern. The communications manager 720 may be configured as or otherwise support a means for communicating with a network entity during the time period based on the one or more operating parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for using interference parameters associated with an pattern of some IDC interference to reduce effects of the interference during communications between wireless devices, which may maintain signaling throughput, reduce latency, and provide for a more efficient utilization of communication resources.

Figure 8:
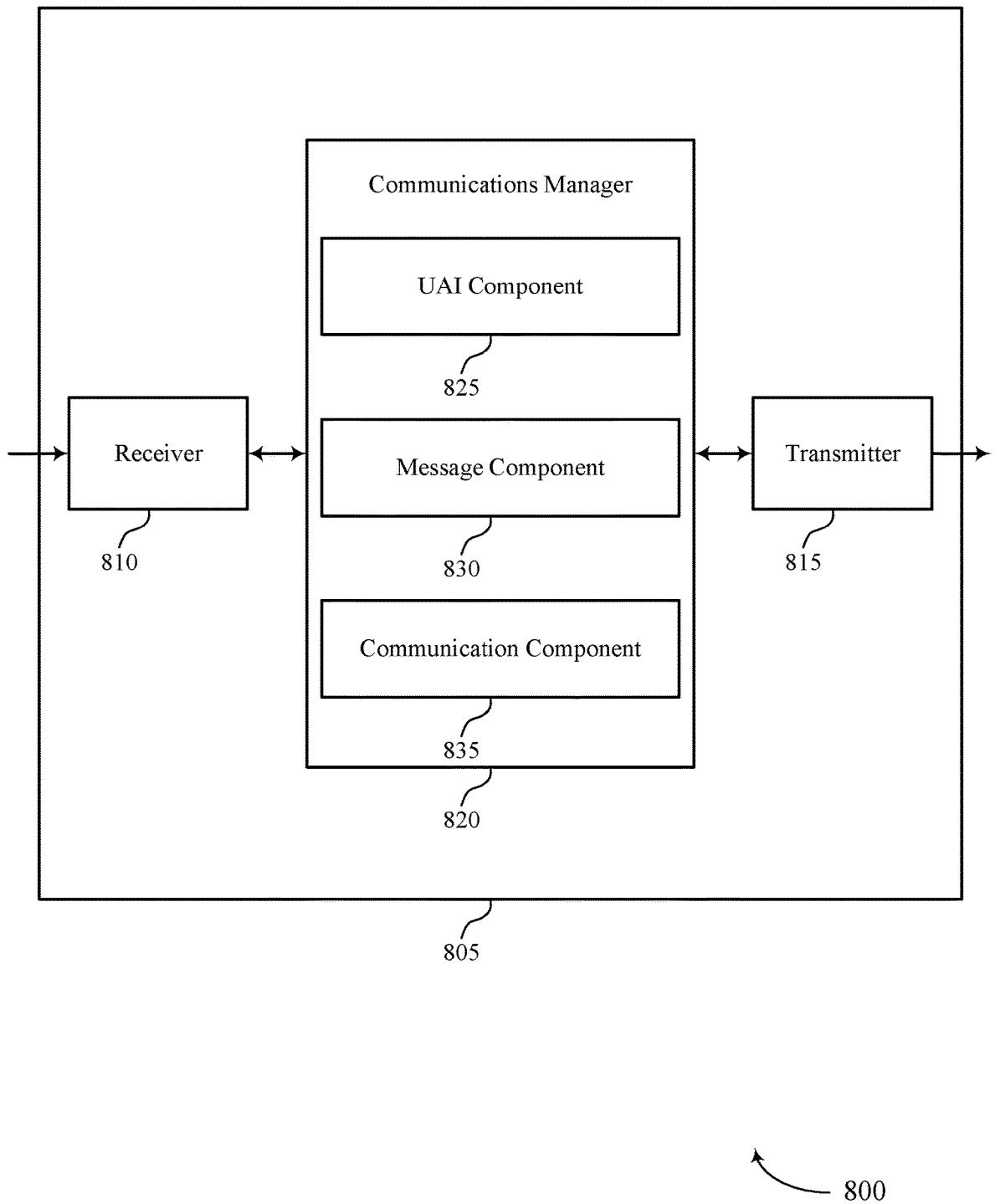

FIG. 8 shows a block diagram 800 of a device 805 that supports IDC interference parameters in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to IDC interference parameters). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to IDC interference parameters). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of IDC interference parameters as described herein. For example, the communications manager 820 may include a UAI component 825, a message component 830, a communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The UAI component 825 may be configured as or otherwise support a means for transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The message component 830 may be configured as or otherwise support a means for receiving a message indicating one or more operating parameters associated with a time period that is based on the interference pattern, the one or more operating parameters based on the type of IDC interference, the set of interference parameters, and the interference pattern. The communication component 835 may be configured as or otherwise support a means for communicating with a network entity during the time period based on the one or more operating parameters.

Figure 9:
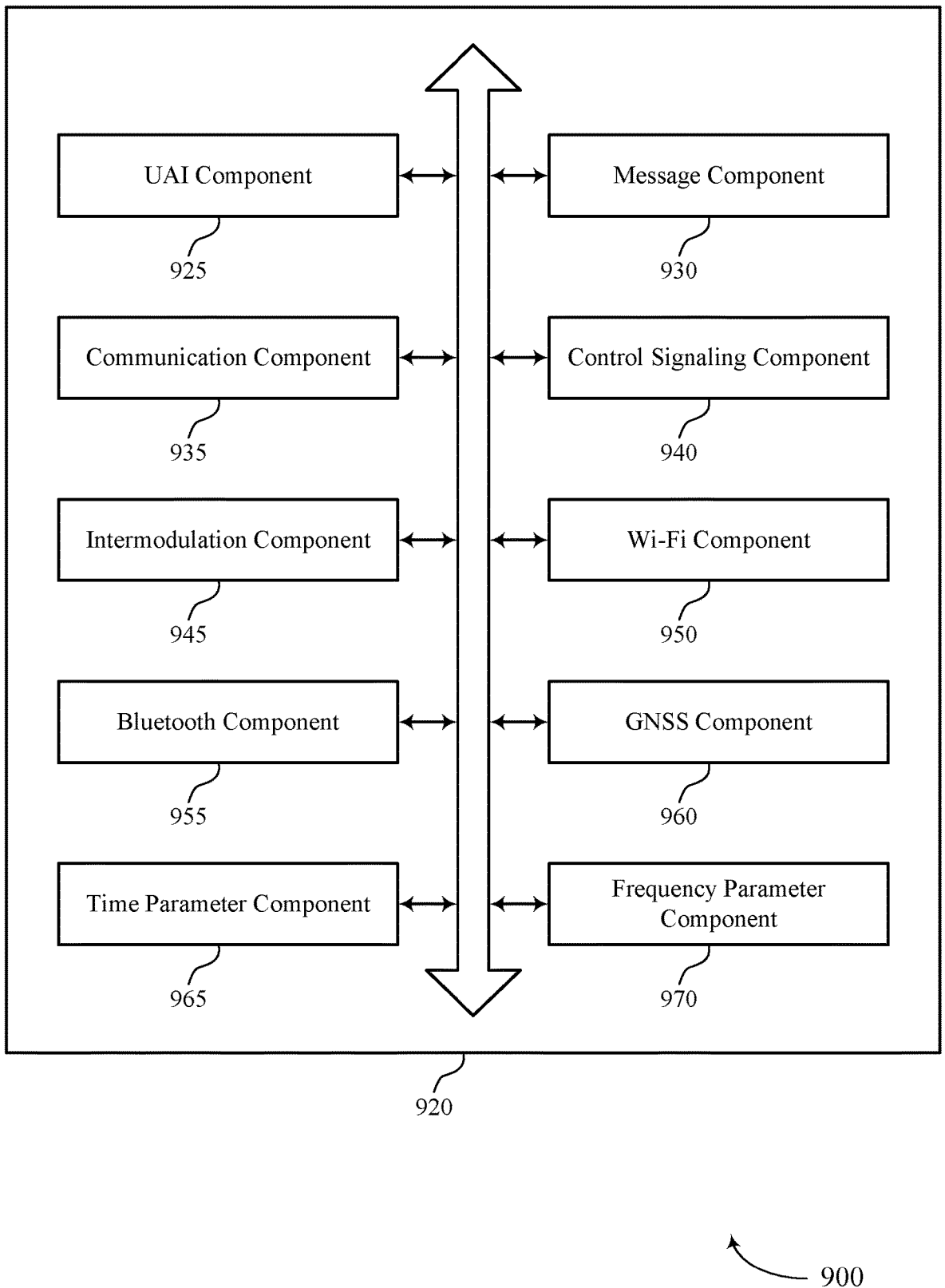
FIG. 9 shows a block diagram of a communications manager that supports IDC interference parameters in accordance with one or more aspects of the present disclosure.

FIG. 9 shows a block diagram 900 of a communications manager 920 that supports IDC interference parameters in accordance with one or more aspects of the present disclosure. The communications manager 920 may be an example of aspects of a communications manager 720, a communications manager 820, or both, as described herein. The communications manager 920, or various components thereof, may be an example of means for performing various aspects of IDC interference parameters as described herein. For example, the communications manager 920 may include a UAI component 925, a message component 930, a communication component 935, a control signaling component 940, an intermodulation component 945, a Wi-Fi component 950, a Bluetooth component 955, an GNSS component 960, a time parameter component 965, a frequency parameter component 970, or any combination thereof. Each of these components may communicate, directly or indirectly, with one another (e.g., via one or more buses).

The communications manager 920 may support wireless communication at a UE in accordance with examples as disclosed herein. The UAI component 925 may be configured as or otherwise support a means for transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The message component 930 may be configured as or otherwise support a means for receiving a message indicating one or more operating parameters associated with a time period that is based on the interference pattern, the one or more operating parameters based on the type of IDC interference, the set of interference parameters, and the interference pattern. The communication component 935 may be configured as or otherwise support a means for communicating with a network entity during the time period based on the one or more operating parameters.

In some examples, the control signaling component 940 may be configured as or otherwise support a means for receiving control signaling indicating a TDD pattern, a DRX pattern, a gap pattern, or any combination thereof based on the type of IDC, the set of interference parameters, and the interference pattern. In some examples, the communication component 935 may be configured as or otherwise support a means for communicating with the network entity during the time period based on the TDD pattern, the DRX pattern, the gap pattern, or any combination thereof.

In some examples, to support transmitting the assistance information, the intermodulation component 945 may be configured as or otherwise support a means for transmitting a UAI message that indicates a frequency intermodulation between an MN and an SN, where the IDC interference is based on the frequency intermodulation.

In some examples, the Wi-Fi component 950 may be configured as or otherwise support a means for transmitting the assistance information indicating uplink traffic at the UE and indicating the set of interference parameters, where the set of interference parameters corresponds to the interference pattern of the uplink traffic in the time domain and in a frequency domain. In some examples, the Wi-Fi component 950 may be configured as or otherwise support a means for receiving control signaling indicating to delay reception of a Wi-Fi transmission until after the time period based on the uplink traffic, the set of interference parameters, and the interference pattern. In some examples, the Wi-Fi component 950 may be configured as or otherwise support a means for receiving the Wi-Fi transmission after the time period based on the control signaling.

In some examples, the Bluetooth component 955 may be configured as or otherwise support a means for transmitting the assistance information indicating an eSCO interference and indicating the set of interference parameters, where the set of interference parameters corresponds to the interference pattern of the eSCO interference in the time domain and in a frequency domain. In some examples, the Bluetooth component 955 may be configured as or otherwise support a means for receiving control signaling indicating an eSCO interval including a transmit slot and a receive slot and indicating a start time of the eSCO interval based on the eSCO interference, the set of interference parameters, and the interference pattern. In some examples, the Bluetooth component 955 may be configured as or otherwise support a means for receiving a signal during the eSCO interval based on the control signaling.

In some examples, the GNSS component 960 may be configured as or otherwise support a means for transmitting the assistance information indicating a bit period interference at a non-terrestrial device and indicating the set of interference parameters including a start time parameter, a duration parameter, and an offset parameter, where the set of interference parameters corresponds to the interference pattern of the bit period interference in the time domain and in a frequency domain. In some examples, the GNSS component 960 may be configured as or otherwise support a means for receiving control signaling indicating a phase associated with a bit period for communicating with the non-terrestrial device based on the bit period interference, the start time parameter, the duration parameter, and the offset parameter. In some examples, the GNSS component 960 may be configured as or otherwise support a means for communicating with the non-terrestrial device during the time period based on the phase.

In some examples, the intermodulation component 945 may be configured as or otherwise support a means for transmitting the assistance information indicating a frequency intermodulation interference between an MN and an SN and indicating the set of interference parameters, where the set of interference parameters includes at least a DC parameter and corresponds to the interference pattern of the frequency intermodulation interference in the time domain and a frequency domain. In some examples, the intermodulation component 945 may be configured as or otherwise support a means for receiving control signaling indicating the one or more operating parameters associated with the time period that is based on the frequency intermodulation interference and the DC parameter. In some examples, the intermodulation component 945 may be configured as or otherwise support a means for receiving one or more messages from the MN and the SN during the time period based on the one or more operating parameters.

In some examples, to support transmitting the assistance information, the time parameter component 965 may be configured as or otherwise support a means for transmitting a UAI message that indicates the set of interference parameters, where the set of interference parameters includes a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

In some examples, the periodicity parameter indicates a periodicity of the interference pattern. In some examples, the periodicity parameter indicate a start time, an end time, and a duration of the interference pattern. In some examples, the time offset parameter indicates a time offset between a first start time of the interference pattern and a second start time of a transmission that creates the IDC interference. In some examples, the power parameter indicates a maximum power the UE is to use during the time period.

In some examples, to support transmitting the assistance information, the frequency parameter component 970 may be configured as or otherwise support a means for transmitting a UAI message that indicates the set of interference parameters that corresponds to the interference pattern of the IDC interference in a frequency domain, where the set of interference parameters includes a BWP parameter, a PRB set parameter, a center frequency parameter, a bandwidth parameter, a DC parameter, or any combination thereof.

In some examples, the BWP parameter indicates an identifier of a BWP associated with the IDC interference. In some examples, the PRB set parameter indicates a PRB in which the interference pattern begins, a quantity of PRBs included in the interference pattern, or both. In some examples, the DC parameter indicates whether the IDC interference is associated with a frequency intermodulation in DC.

Figure 10:
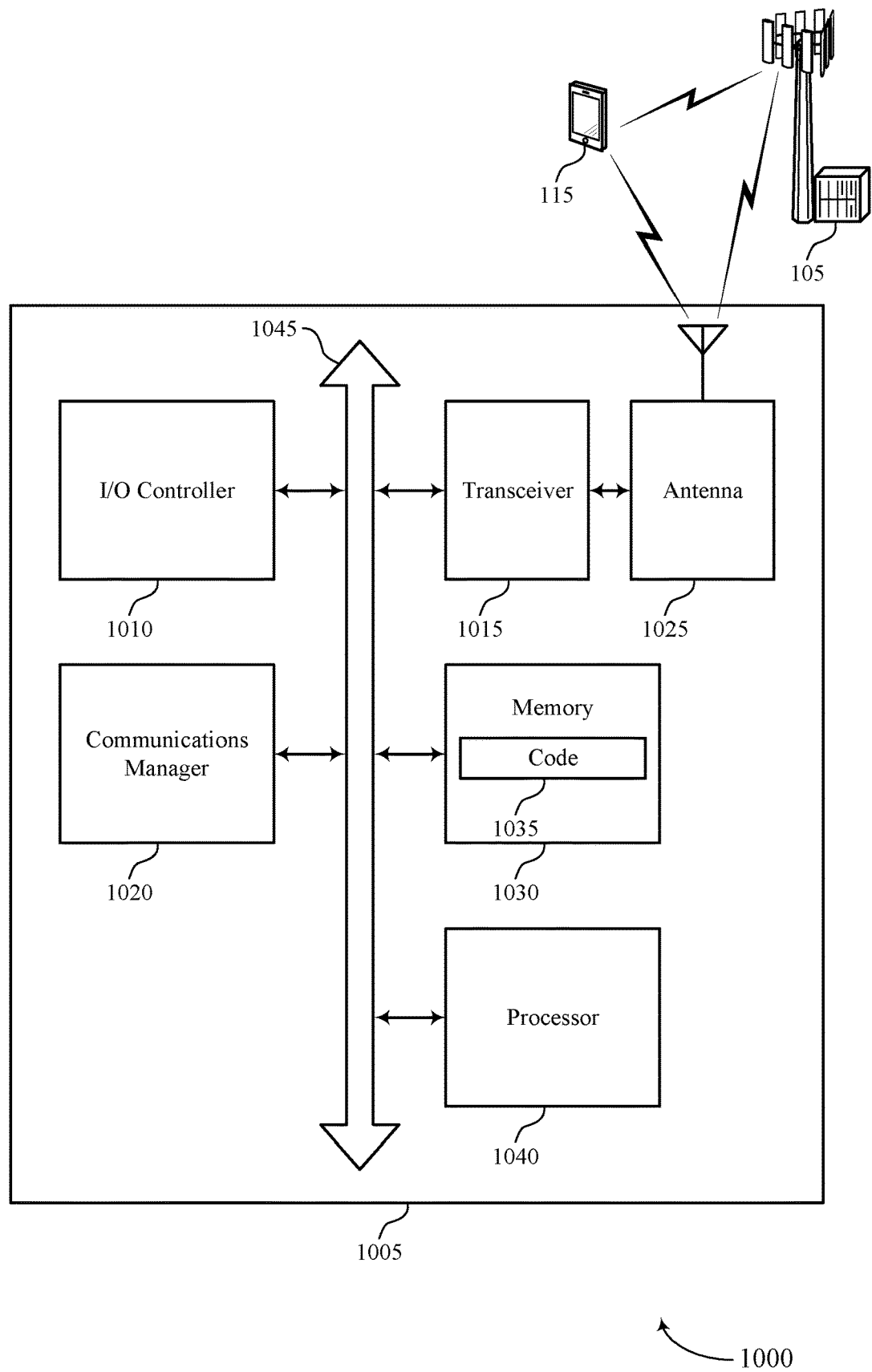
FIG. 10 shows a diagram of a system including a device that supports IDC interference parameters in accordance with one or more aspects of the present disclosure.

FIG. 10 shows a diagram of a system 1000 including a device 1005 that supports IDC interference parameters in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting IDC interference parameters). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The communications manager 1020 may be configured as or otherwise support a means for receiving a message indicating one or more operating parameters associated with a time period that is based on the interference pattern, the one or more operating parameters based on the type of IDC interference, the set of interference parameters, and the interference pattern. The communications manager 1020 may be configured as or otherwise support a means for communicating with a network entity during the time period based on the one or more operating parameters.

By including or configuring the communications manager 1020 in accordance with examples as described herein, the device 1005 may support techniques for using interference parameters associated with an pattern of some IDC interference to reduce effects of the interference during communications between wireless devices, which may maintain signaling throughput, reduce latency, and provide for a more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of IDC interference parameters as described herein, or the processor 1040 and the memory 1030 may be otherwise configured to perform or support such operations.

Figure 11:
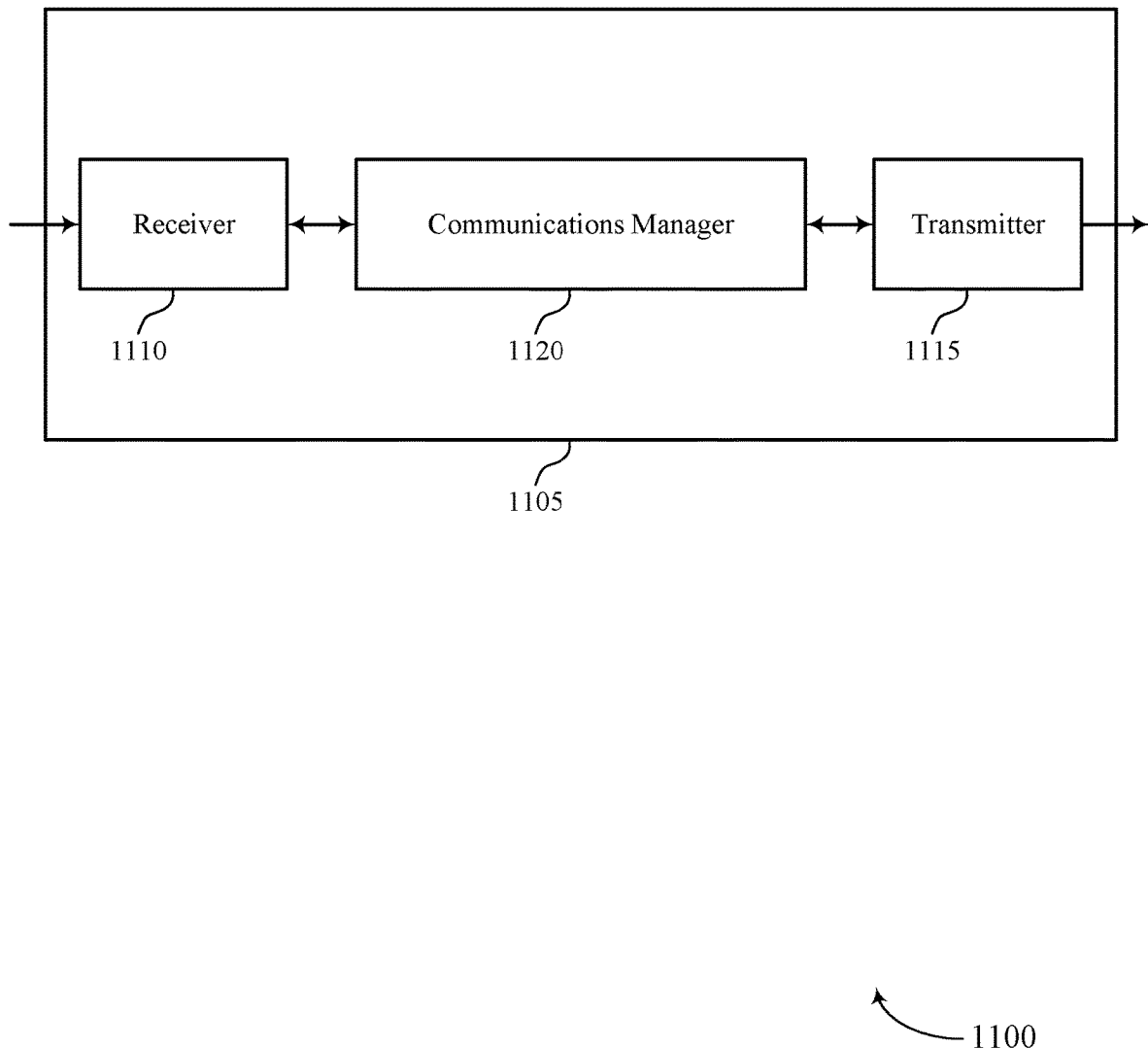
FIGS. 11 and 12 show block diagrams of devices that support IDC interference parameters in accordance with one or more aspects of the present disclosure.

FIG. 11 shows a block diagram 1100 of a device 1105 that supports IDC interference parameters in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of IDC interference parameters as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for receiving assistance information associated with a UE, the assistance information indicating a type of IDC interference at the UE and indicating a set of interference parameters associated with the IDC interference, where the set of interference parameters corresponds to an interference pattern of the IDC interference in a time domain. The communications manager 1120 may be configured as or otherwise support a means for transmitting a message indicating one or more operating parameters associated with a time period that is based on the interference pattern, the one or more operating parameters based on the type of IDC interference, the set of interference parameters, and the interference pattern. The communications manager 1120 may be configured as or otherwise support a means for communicating with the UE during the time period based on the one or more operating parameters.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for using interference parameters associated with an pattern of some IDC interference to reduce effects of the interference during communications between wireless devices, which may maintain signaling throughput, reduce latency, and provide for a more efficient utilization of communication resources.

Figure 12:
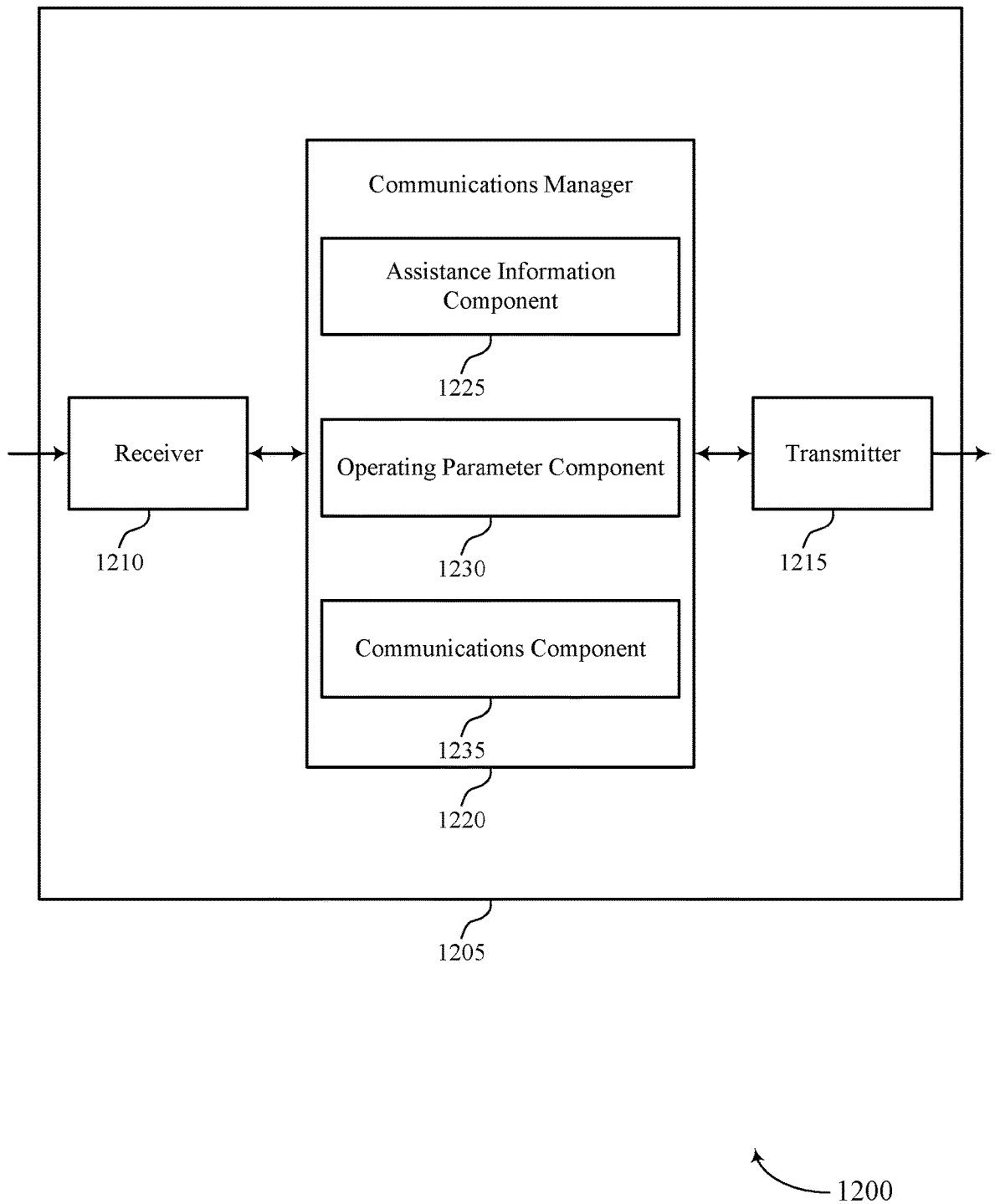

FIG. 12 shows a block diagram 1200 of a device 1205 that supports IDC interference parameters in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of IDC interference parameters as described herein. For example, the communications manager 1220 may include an assistance information component 1225, an operating parameter component 1230, a communications component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The assistance information component 1225 may be configured as or otherwise support a means for receiving assistance information associated with a UE, the assistance information indicating a type of IDC interference at the UE and indicating a set of interference parameters associated with the IDC interference, where the set of interference parameters corresponds to an interference pattern of the IDC interference in a time domain. The operating parameter component 1230 may be configured as or otherwise support a means for transmitting a message indicating one or more operating parameters associated with a time period that is based on the interference pattern, the one or more operating parameters based on the type of IDC interference, the set of interference parameters, and the interference pattern. The communications component 1235 may be configured as or otherwise support a means for communicating with the UE during the time period based on the one or more operating parameters.

Figure 13:
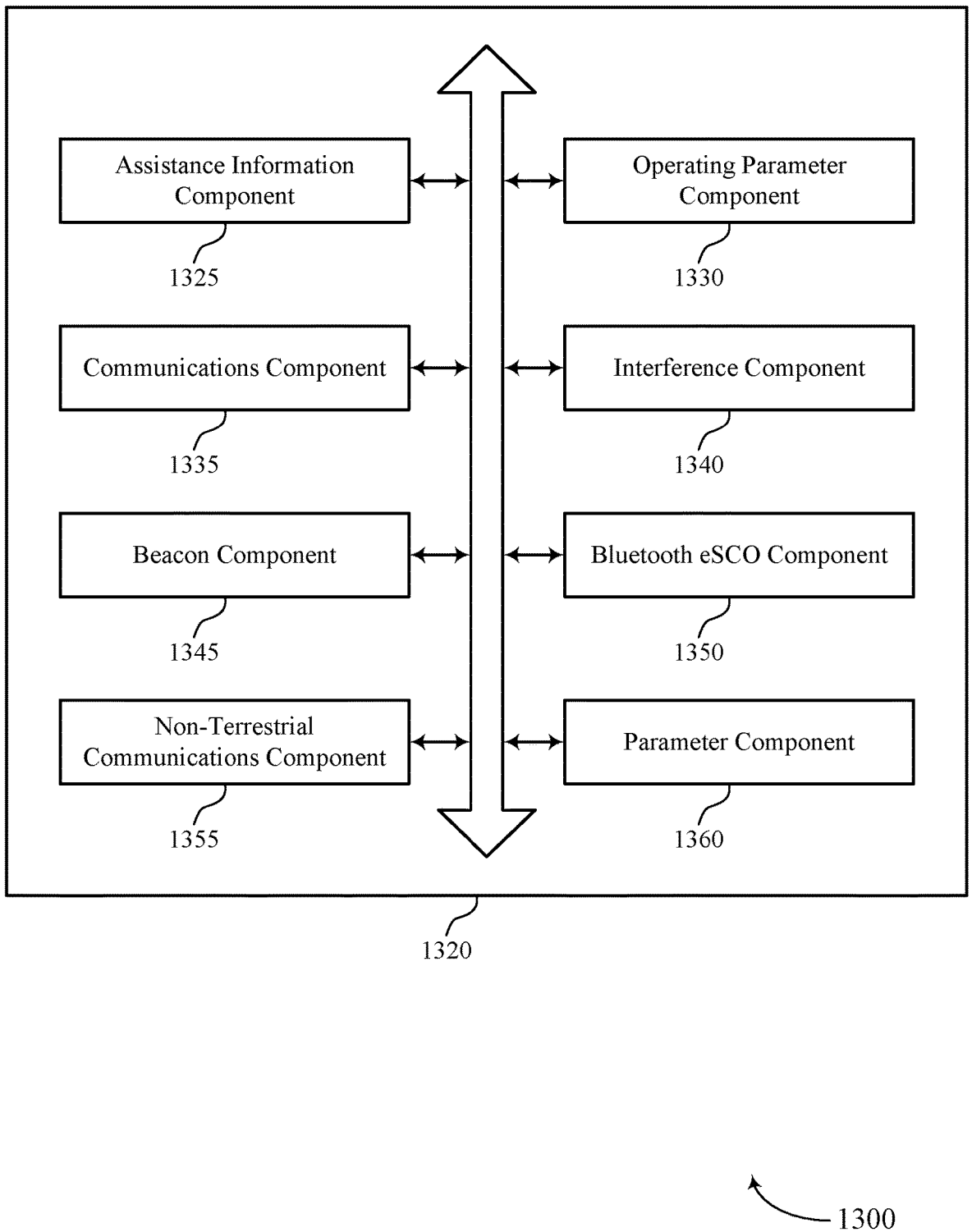
FIG. 13 shows a block diagram of a communications manager that supports IDC interference parameters in accordance with one or more aspects of the present disclosure.

FIG. 13 shows a block diagram 1300 of a communications manager 1320 that supports IDC interference parameters in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of IDC interference parameters as described herein. For example, the communications manager 1320 may include an assistance information component 1325, an operating parameter component 1330, a communications component 1335, an interference component 1340, a beacon component 1345, a Bluetooth eSCO component 1350, a non-terrestrial communications component 1355, a parameter component 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The assistance information component 1325 may be configured as or otherwise support a means for receiving assistance information associated with a UE, the assistance information indicating a type of IDC interference at the UE and indicating a set of interference parameters associated with the IDC interference, where the set of interference parameters corresponds to an interference pattern of the IDC interference in a time domain. The operating parameter component 1330 may be configured as or otherwise support a means for transmitting a message indicating one or more operating parameters associated with a time period that is based on the interference pattern, the one or more operating parameters based on the type of IDC interference, the set of interference parameters, and the interference pattern. The communications component 1335 may be configured as or otherwise support a means for communicating with the UE during the time period based on the one or more operating parameters.

In some examples, the operating parameter component 1330 may be configured as or otherwise support a means for transmitting control signaling indicating a TDD pattern, a DRX pattern, a gap pattern, or any combination thereof based on the type of IDC, the set of interference parameters, and the interference pattern. In some examples, the communications component 1335 may be configured as or otherwise support a means for communicating with the UE during the time period based on the TDD pattern, the DRX pattern, the gap pattern, or any combination thereof.

In some examples, to support receiving the assistance information, the interference component 1340 may be configured as or otherwise support a means for receiving a UAI message that indicates a frequency intermodulation between an MN and an SN, where the IDC interference is based on the frequency intermodulation.

In some examples, the beacon component 1345 may be configured as or otherwise support a means for receiving the assistance information indicating uplink traffic at the UE and indicating the set of interference parameters, where the set of interference parameters corresponds to the interference pattern of the uplink traffic in the time domain and in a frequency domain. In some examples, the beacon component 1345 may be configured as or otherwise support a means for transmitting control signaling indicating to delay reception of a Wi-Fi transmission until after the time period based on the uplink traffic, the set of interference parameters, and the interference pattern. In some examples, the beacon component 1345 may be configured as or otherwise support a means for transmitting the Wi-Fi transmission after the time period based on the control signaling.

In some examples, the Bluetooth eSCO component 1350 may be configured as or otherwise support a means for receiving the assistance information indicating an eSCO and indicating the set of interference parameters, where the set of interference parameters corresponds to the interference pattern of the eSCO interference in the time domain and in a frequency domain. In some examples, the Bluetooth eSCO component 1350 may be configured as or otherwise support a means for transmitting control signaling indicating an eSCO interval including a transmit slot and a receive slot and indicating a start time of the eSCO interval based on the eSCO interference, the set of interference parameters, and the interference pattern. In some examples, the Bluetooth eSCO component 1350 may be configured as or otherwise support a means for transmitting a signal during the eSCO interval based on the control signaling.

In some examples, the non-terrestrial communications component 1355 may be configured as or otherwise support a means for receiving the assistance information indicating a bit period interference at a non-terrestrial device and indicating the set of interference parameters including a start time parameter, a duration parameter, and an offset parameter, where the set of interference parameters corresponds to the interference pattern of the bit period interference in the time domain and in a frequency domain. In some examples, the non-terrestrial communications component 1355 may be configured as or otherwise support a means for transmitting control signaling indicating a phase associated with a bit period for communicating with the non-terrestrial device based on the bit period interference, the start time parameter, the duration parameter, and the offset parameter. In some examples, the non-terrestrial communications component 1355 may be configured as or otherwise support a means for communicating with the non-terrestrial device during the time period based on the phase.

In some examples, the interference component 1340 may be configured as or otherwise support a means for receiving the assistance information indicating a frequency intermodulation interference between an MN and an SN and indicating the set of interference parameters, where the set of interference parameters includes at least a DC parameter and corresponds to the interference pattern of the frequency intermodulation interference in the time domain and a frequency domain. In some examples, the interference component 1340 may be configured as or otherwise support a means for transmitting control signaling indicating the one or more operating parameters associated with the time period that is based on the frequency intermodulation interference and the DC parameter. In some examples, the interference component 1340 may be configured as or otherwise support a means for transmitting one or more messages from the MN and the SN during the time period based on the one or more operating parameters.

In some examples, to support receiving the assistance information, the parameter component 1360 may be configured as or otherwise support a means for receiving a UAI message that indicates the set of interference parameters, where the set of interference parameters includes a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

In some examples, the periodicity parameter indicates a periodicity of the interference pattern. In some examples, the periodicity parameter indicate a start time, an end time, and a duration of the interference pattern. In some examples, the time offset parameter indicates a time offset between a first start time of the interference pattern and a second start time of a transmission that creates the IDC interference. In some examples, the power parameter indicates a maximum power the UE is to use during the time period.

In some examples, to support receiving the assistance information, the parameter component 1360 may be configured as or otherwise support a means for receiving a UAI message that indicates the set of interference parameters that corresponds to the interference pattern of the IDC interference in a frequency domain, where the set of interference parameters includes a BWP parameter, a PRB set parameter, a center frequency parameter, a bandwidth parameter, a DC parameter, or any combination thereof.

In some examples, the BWP parameter indicates an identifier of a BWP associated with the IDC interference. In some examples, the PRB set parameter indicates a PRB in which the interference pattern begins, a quantity of PRBs included in the interference pattern, or both. In some examples, the DC parameter indicates whether the IDC interference is associated with a frequency intermodulation in DC.

Figure 14:
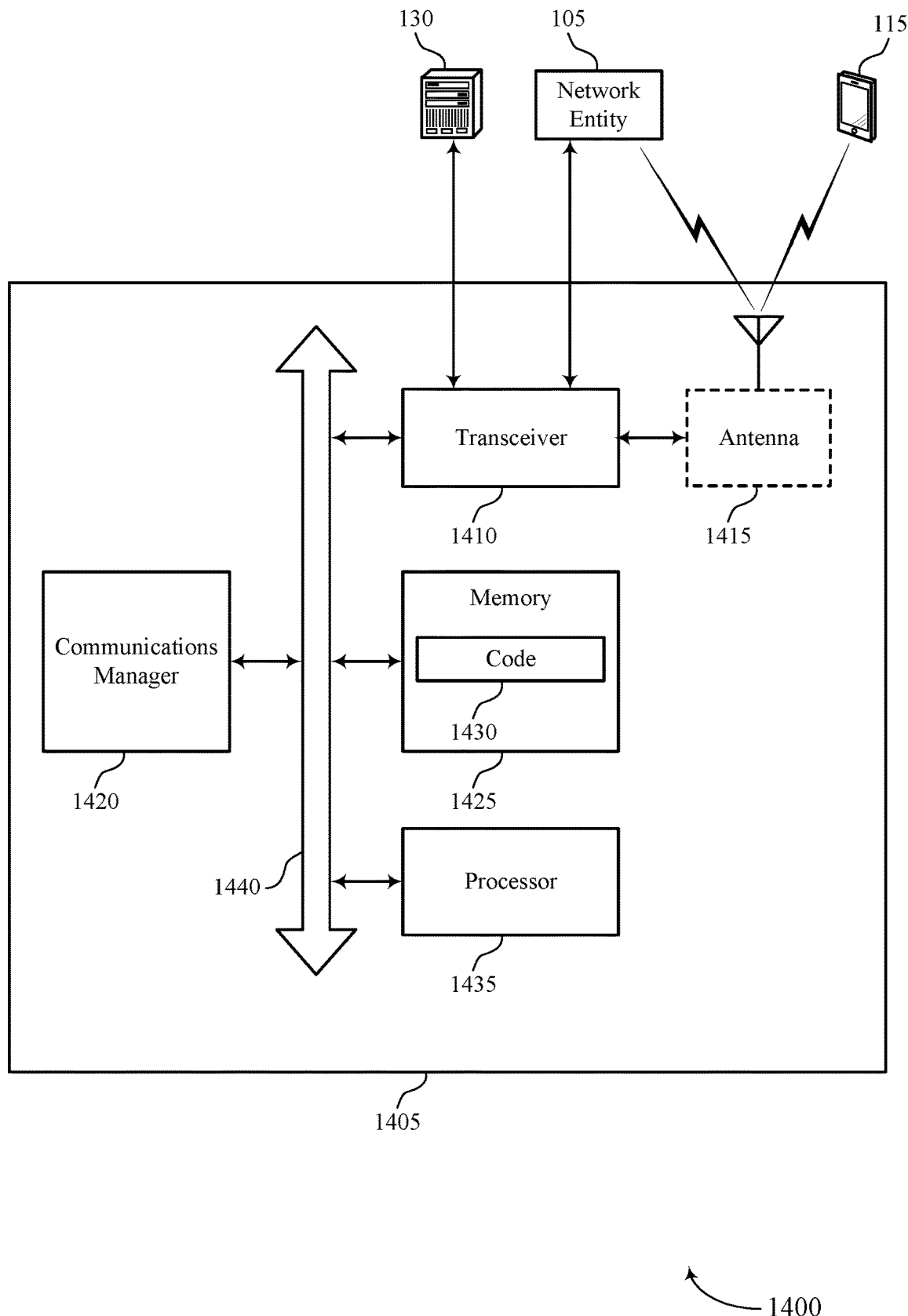
FIG. 14 shows a diagram of a system including a device that supports IDC interference parameters in accordance with one or more aspects of the present disclosure.

FIG. 14 shows a diagram of a system 1400 including a device 1405 that supports IDC interference parameters in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting IDC interference parameters). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for receiving assistance information associated with a UE, the assistance information indicating a type of IDC interference at the UE and indicating a set of interference parameters associated with the IDC interference, where the set of interference parameters corresponds to an interference pattern of the IDC interference in a time domain. The communications manager 1420 may be configured as or otherwise support a means for transmitting a message indicating one or more operating parameters associated with a time period that is based on the interference pattern, the one or more operating parameters based on the type of IDC interference, the set of interference parameters, and the interference pattern. The communications manager 1420 may be configured as or otherwise support a means for communicating with the UE during the time period based on the one or more operating parameters.

By including or configuring the communications manager 1420 in accordance with examples as described herein, the device 1405 may support techniques for using interference parameters associated with an pattern of some IDC interference to reduce effects of the interference during communications between wireless devices, which may maintain signaling throughput, reduce latency, and provide for a more efficient utilization of communication resources.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of IDC interference parameters as described herein, or the processor 1435 and the memory 1425 may be otherwise configured to perform or support such operations.

Figure 15:
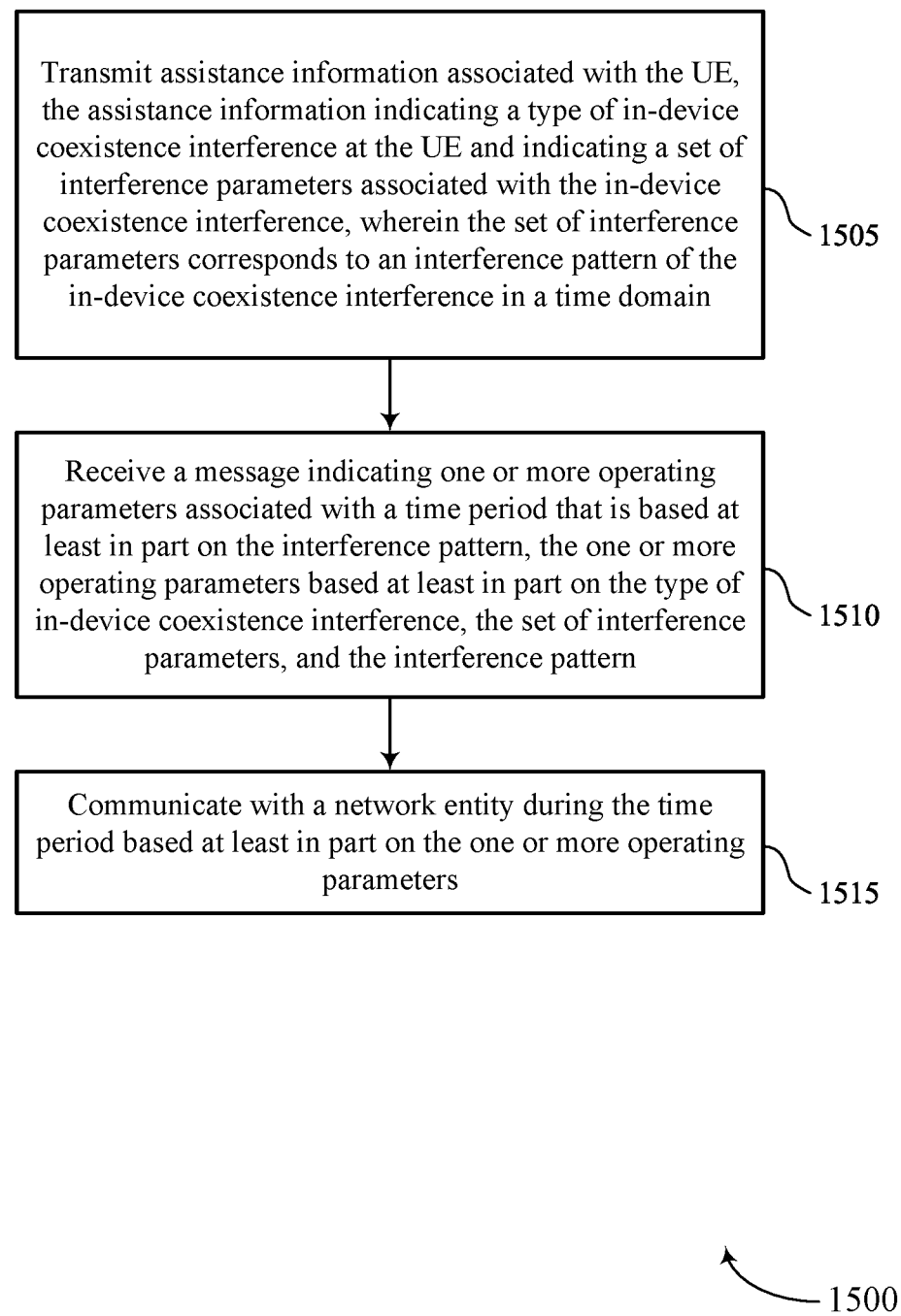
FIGS. 15 through 21 show flowcharts illustrating methods that support IDC interference parameters in accordance with one or more aspects of the present disclosure.

FIG. 15 shows a flowchart illustrating a method 1500 that supports IDC interference parameters in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The operations of 1505 may be performed in accordance with examples as disclosed herein. In some examples, aspects of the operations of 1505 may be performed by a UAI component 925 as described with reference to FIG. 9.

At 1510, the method may include receiving a message indicating one or more operating parameters associated with a time period that is based on the interference pattern, the one or more operating parameters based on the type of IDC interference, the set of interference parameters, and the interference pattern. The operations of 1510 may be performed in accordance with examples as disclosed herein. In some examples, aspects of the operations of 1510 may be performed by a message component 930 as described with reference to FIG. 9.

At 1515, the method may include communicating with a network entity during the time period based on the one or more operating parameters. The operations of 1515 may be performed in accordance with examples as disclosed herein. In some examples, aspects of the operations of 1515 may be performed by a communication component 935 as described with reference to FIG. 9.

Figure 16:
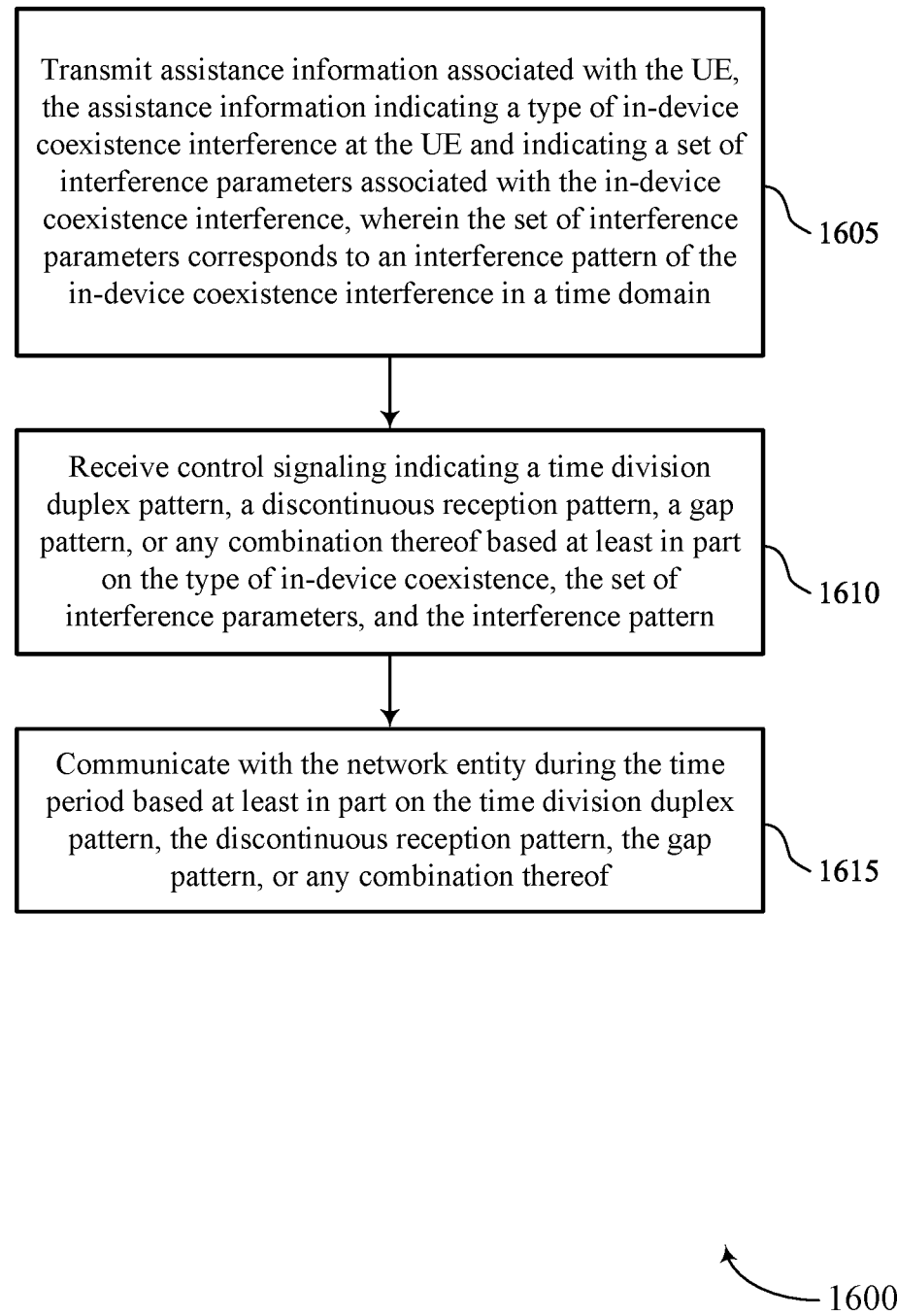

FIG. 16 shows a flowchart illustrating a method 1600 that supports IDC interference parameters in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting assistance information associated with the UE, the assistance information indicating a type of IDC interference at the UE and indicating a set of interference parameters associated with the IDC interference, where the set of interference parameters corresponds to an interference pattern of the IDC interference in a time domain. The operations of 1605 may be performed in accordance with examples as disclosed herein. In some examples, aspects of the operations of 1605 may be performed by a UAI component 925 as described with reference to FIG. 9.

At 1610, the method may include receiving control signaling indicating a TDD pattern, a DRX pattern, a gap pattern, or any combination thereof based on the type of IDC, the set of interference parameters, and the interference pattern. The operations of 1610 may be performed in accordance with examples as disclosed herein. In some examples, aspects of the operations of 1610 may be performed by a control signaling component 940 as described with reference to FIG. 9.

At 1615, the method may include communicating with the network entity during the time period based on the TDD pattern, the DRX pattern, the gap pattern, or any combination thereof. The operations of 1615 may be performed in accordance with examples as disclosed herein. In some examples, aspects of the operations of 1615 may be performed by a communication component 935 as described with reference to FIG. 9.

Figure 17:
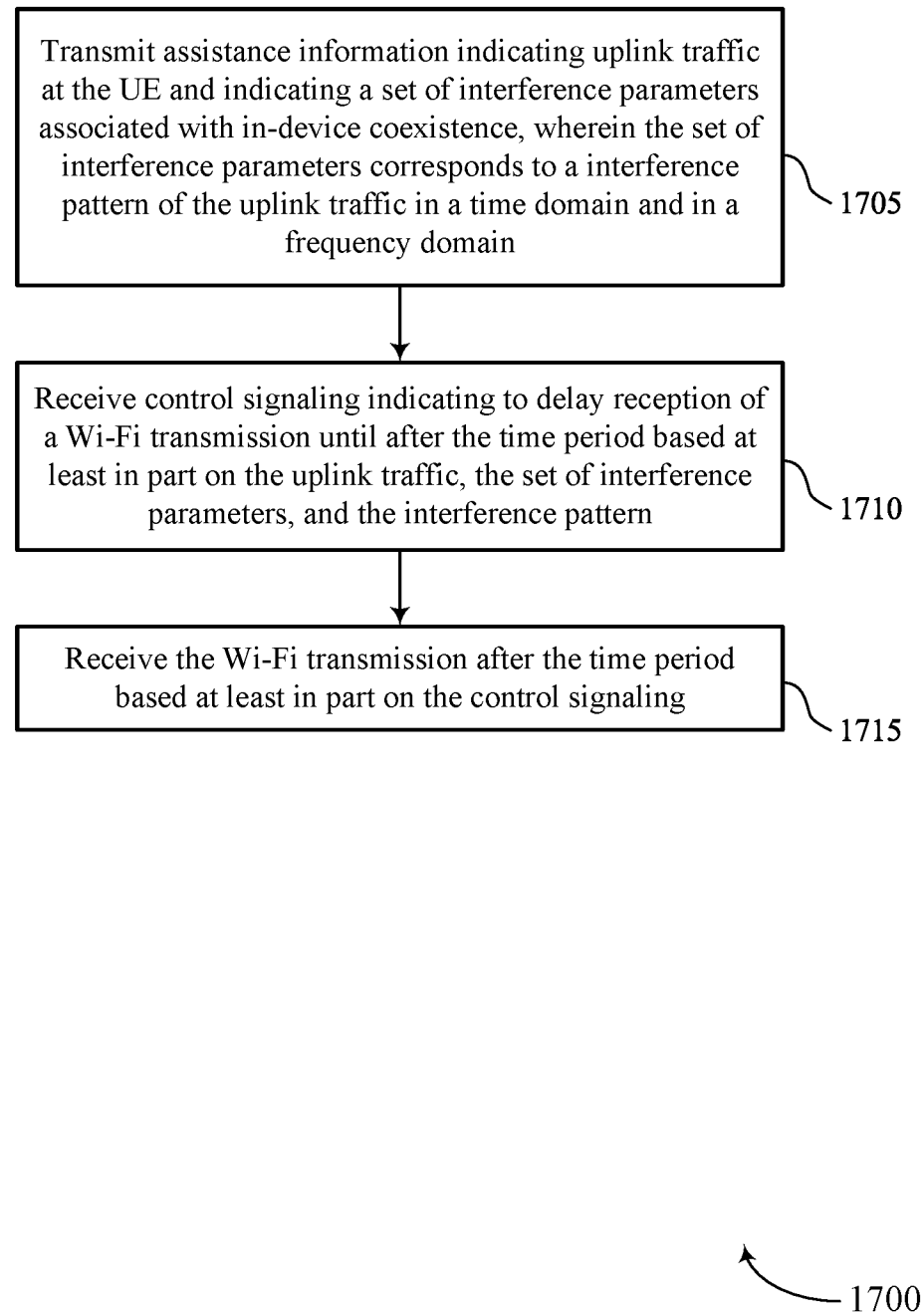

FIG. 17 shows a flowchart illustrating a method 1700 that supports IDC interference parameters in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include transmitting assistance information indicating uplink traffic at the UE and indicating a set of interference parameters associated with IDC interference, where the set of interference parameters corresponds to an interference pattern of the uplink traffic in a time domain and in a frequency domain. The operations of 1705 may be performed in accordance with examples as disclosed herein. In some examples, aspects of the operations of 1705 may be performed by a Wi-Fi component 950 as described with reference to FIG. 9.

At 1710, the method may include receiving control signaling indicating to delay reception of a Wi-Fi transmission until after the time period based on the uplink traffic, the set of interference parameters, and the interference pattern. The operations of 1710 may be performed in accordance with examples as disclosed herein. In some examples, aspects of the operations of 1710 may be performed by a Wi-Fi component 950 as described with reference to FIG. 9.

At 1715, the method may include receiving the Wi-Fi transmission after the time period based on the control signaling. The operations of 1715 may be performed in accordance with examples as disclosed herein. In some examples, aspects of the operations of 1715 may be performed by a Wi-Fi component 950 as described with reference to FIG. 9.

Figure 18:
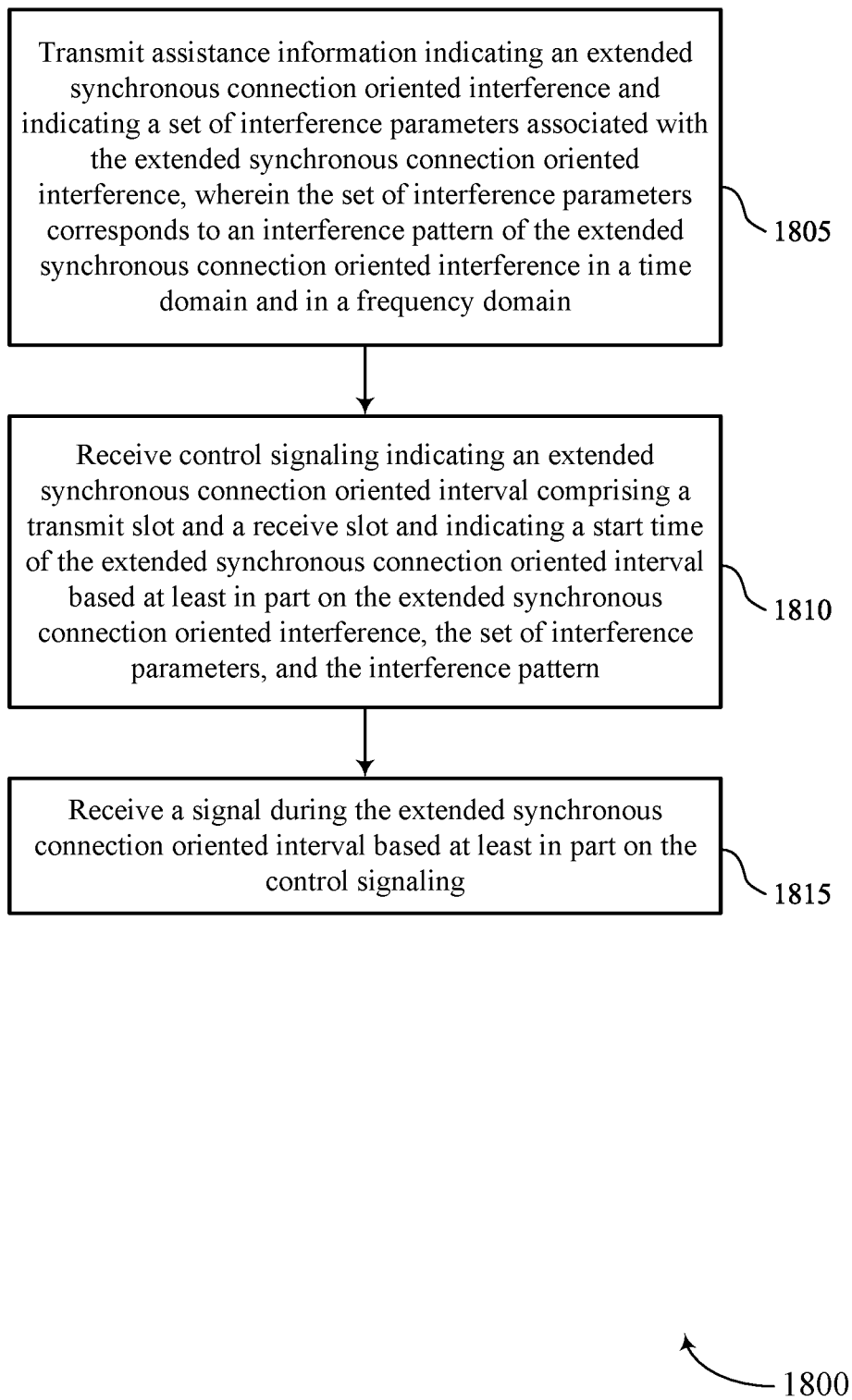

FIG. 18 shows a flowchart illustrating a method 1800 that supports IDC interference parameters in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include transmitting assistance information indicating an eSCO interference and indicating a set of interference parameters associated with the eSCO interference, where the set of interference parameters corresponds to an interference pattern of the eSCO interference in a time domain and in a frequency domain. The operations of 1805 may be performed in accordance with examples as disclosed herein. In some examples, aspects of the operations of 1805 may be performed by a Bluetooth component 955 as described with reference to FIG. 9.

At 1810, the method may include receiving control signaling indicating an eSCO interval including a transmit slot and a receive slot and indicating a start time of the eSCO interval based on the eSCO interference, the set of interference parameters, and the interference pattern. The operations of 1810 may be performed in accordance with examples as disclosed herein. In some examples, aspects of the operations of 1810 may be performed by a Bluetooth component 955 as described with reference to FIG. 9.

At 1815, the method may include receiving a signal during the eSCO interval based on the control signaling. The operations of 1815 may be performed in accordance with examples as disclosed herein. In some examples, aspects of the operations of 1815 may be performed by a Bluetooth component 955 as described with reference to FIG. 9.

Figure 19:
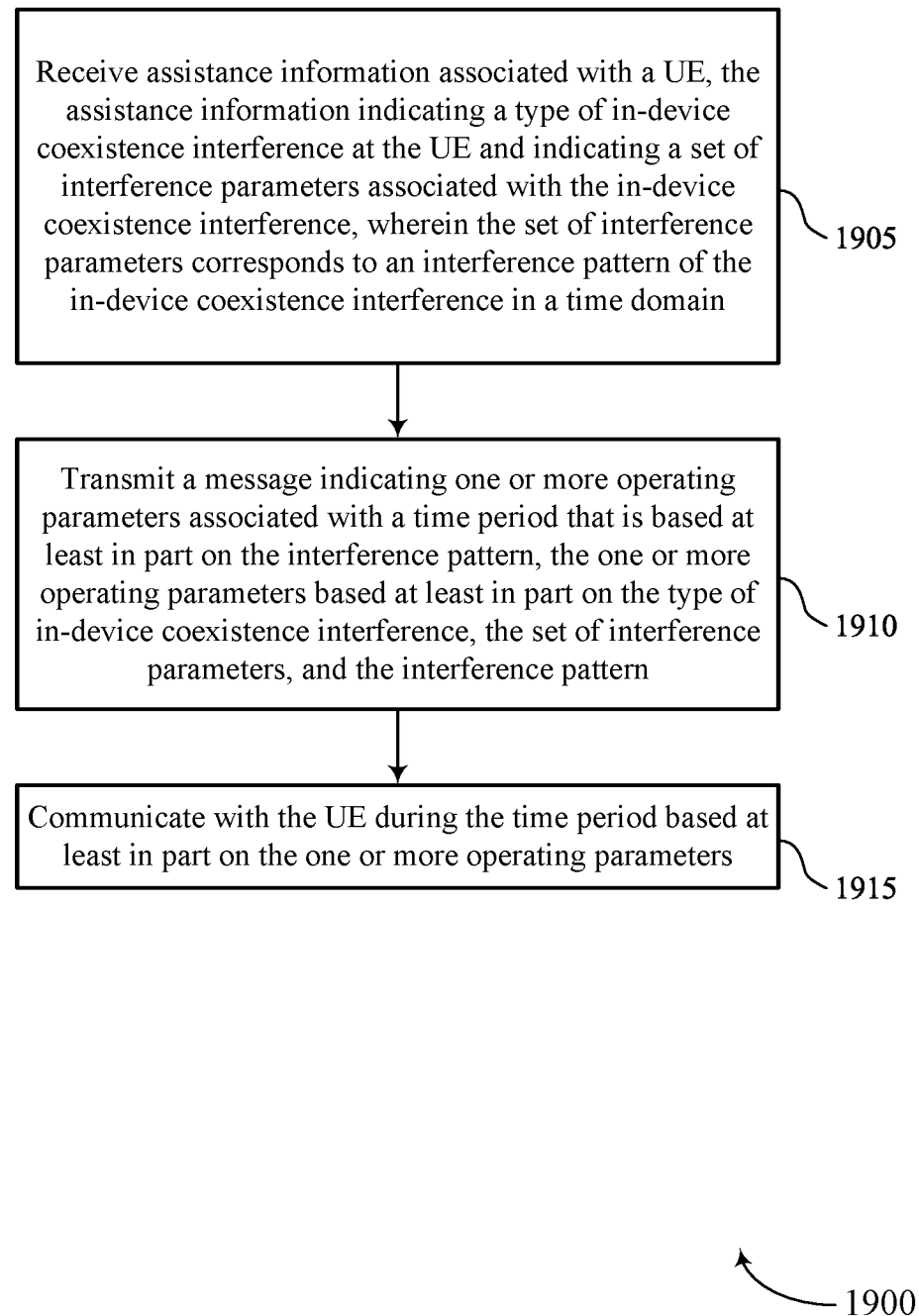

FIG. 19 shows a flowchart illustrating a method 1900 that supports IDC interference parameters in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include receiving assistance information associated with a UE, the assistance information indicating a type of IDC interference at the UE and indicating a set of interference parameters associated with the IDC interference, where the set of interference parameters corresponds to an interference pattern of the IDC interference in a time domain. The operations of 1905 may be performed in accordance with examples as disclosed herein. In some examples, aspects of the operations of 1905 may be performed by an assistance information component 1325 as described with reference to FIG. 13.

At 1910, the method may include transmitting a message indicating one or more operating parameters associated with a time period that is based on the interference pattern, the one or more operating parameters based on the type of IDC interference, the set of interference parameters, and the interference pattern. The operations of 1910 may be performed in accordance with examples as disclosed herein. In some examples, aspects of the operations of 1910 may be performed by an operating parameter component 1330 as described with reference to FIG. 13.

At 1915, the method may include communicating with the UE during the time period based on the one or more operating parameters. The operations of 1915 may be performed in accordance with examples as disclosed herein. In some examples, aspects of the operations of 1915 may be performed by a communications component 1335 as described with reference to FIG. 13.

Figure 20:
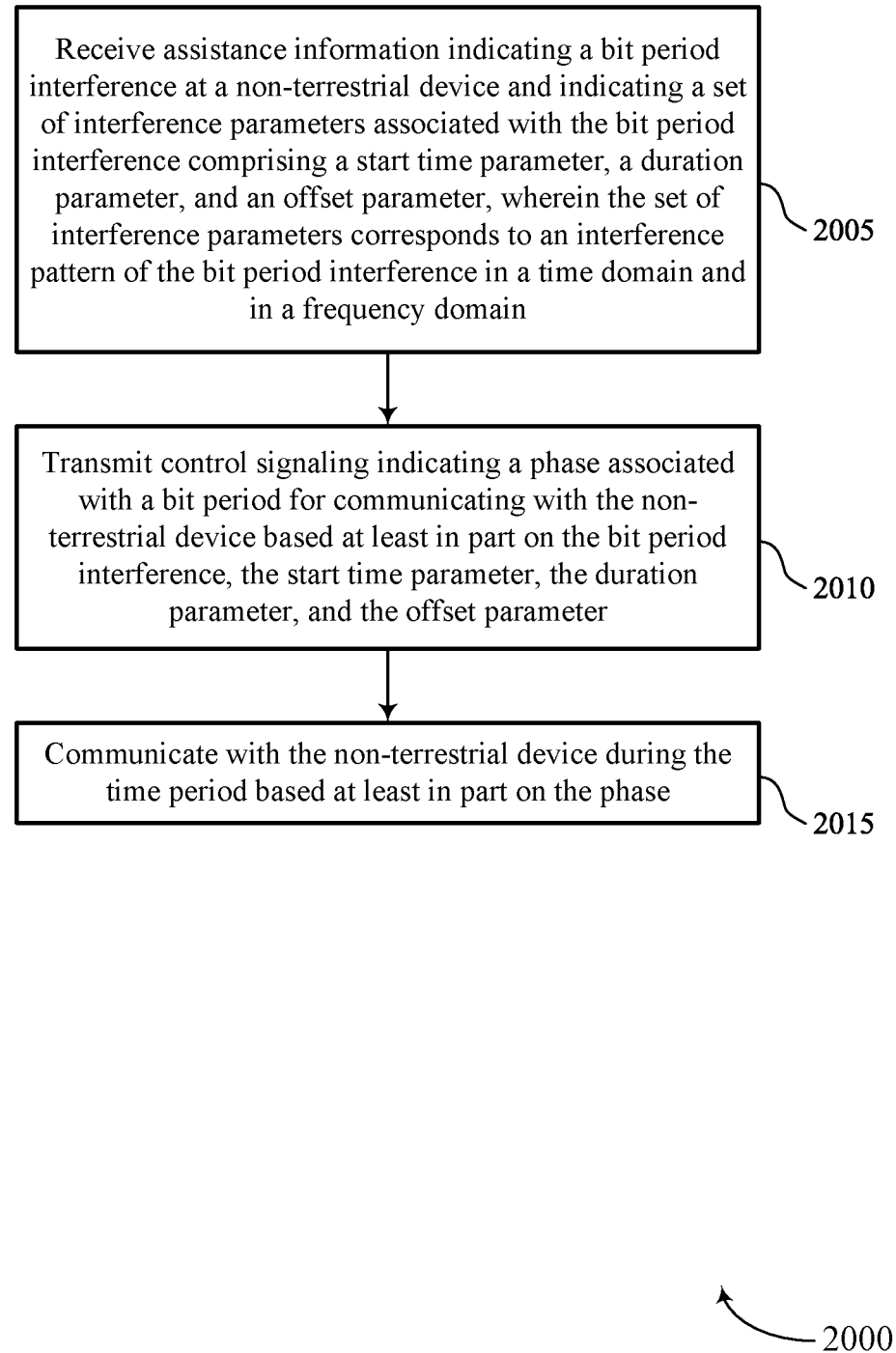

FIG. 20 shows a flowchart illustrating a method 2000 that supports IDC interference parameters in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include receiving assistance information indicating a bit period interference at a non-terrestrial device and indicating a set of interference parameters associated with the bit period interference including a start time parameter, a duration parameter, and an offset parameter, where the set of interference parameters corresponds to an interference pattern of the bit period interference in a time domain and in a frequency domain. The operations of 2005 may be performed in accordance with examples as disclosed herein. In some examples, aspects of the operations of 2005 may be performed by a non-terrestrial communications component 1355 as described with reference to FIG. 13.

At 2010, the method may include transmitting control signaling indicating a phase associated with a bit period for communicating with the non-terrestrial device based on the bit period interference, the start time parameter, the duration parameter, and the offset parameter. The operations of 2010 may be performed in accordance with examples as disclosed herein. In some examples, aspects of the operations of 2010 may be performed by a non-terrestrial communications component 1355 as described with reference to FIG. 13.

At 2015, the method may include communicating with the non-terrestrial device during the time period based on the phase. The operations of 2015 may be performed in accordance with examples as disclosed herein. In some examples, aspects of the operations of 2015 may be performed by a non-terrestrial communications component 1355 as described with reference to FIG. 13.

Figure 21:
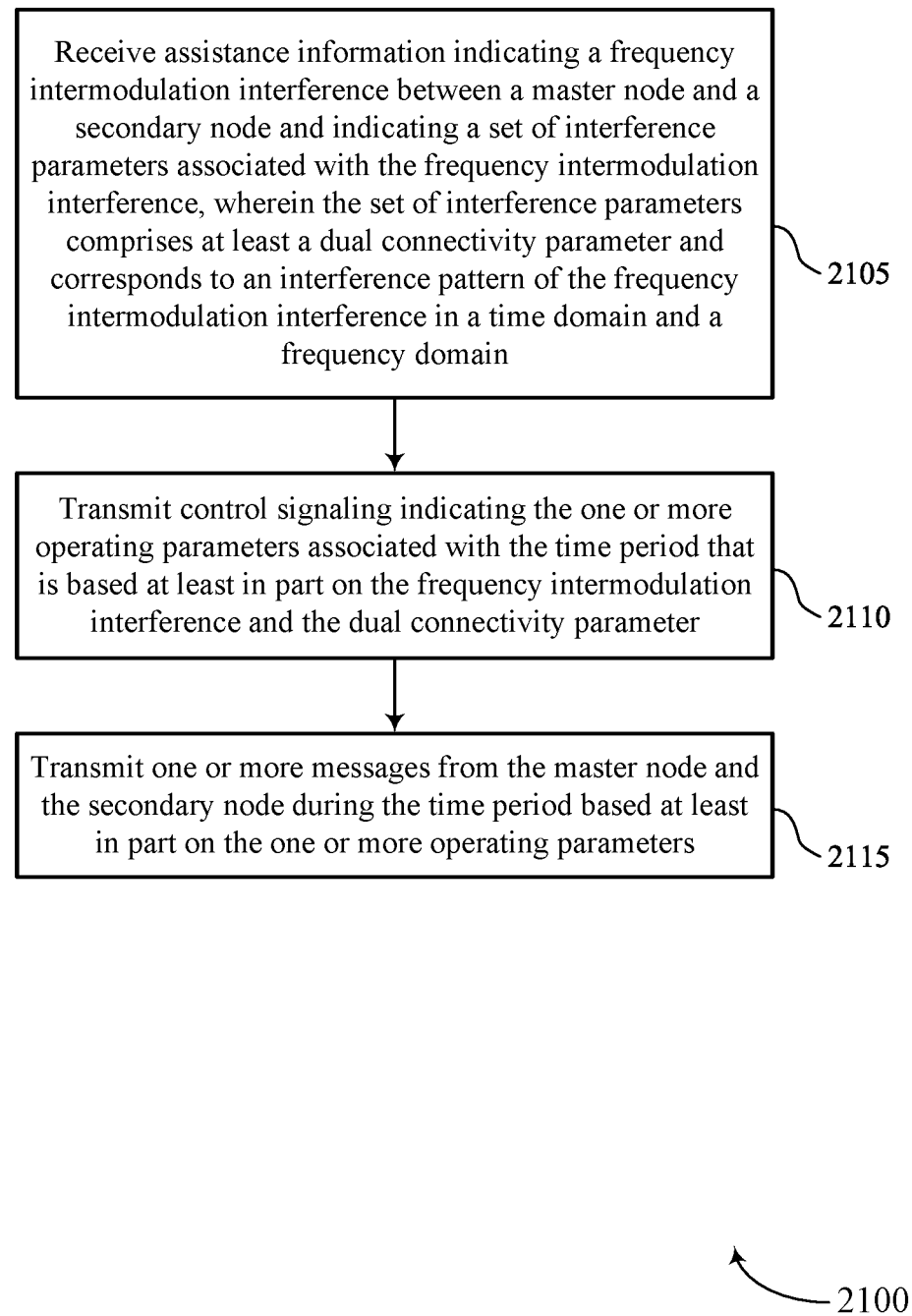

FIG. 21 shows a flowchart illustrating a method 2100 that supports IDC interference parameters in accordance with one or more aspects of the present disclosure. The operations of the method 2100 may be implemented by a network entity or its components as described herein. For example, the operations of the method 2100 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2105, the method may include receiving assistance information indicating a frequency intermodulation interference between an MN and an SN and indicating a set of interference parameters associated with the frequency intermodulation interference, where the set of interference parameters includes at least a DC parameter and corresponds to an interference pattern of the frequency intermodulation interference in a time domain and a frequency domain. The operations of 2105 may be performed in accordance with examples as disclosed herein. In some examples, aspects of the operations of 2105 may be performed by an interference component 1340 as described with reference to FIG. 13.

At 2110, the method may include transmitting control signaling indicating the one or more operating parameters associated with the time period that is based on the frequency intermodulation interference and the DC parameter. The operations of 2110 may be performed in accordance with examples as disclosed herein. In some examples, aspects of the operations of 2110 may be performed by an interference component 1340 as described with reference to FIG. 13.

At 2115, the method may include transmitting one or more messages from the MN and the SN during the time period based on the one or more operating parameters. The operations of 2115 may be performed in accordance with examples as disclosed herein. In some examples, aspects of the operations of 2115 may be performed by an interference component 1340 as described with reference to FIG. 13.

The following provides an overview of aspects of the present disclosure:

Aspect 1: A method for wireless communication at a UE, comprising: transmitting assistance information associated with the UE, the assistance information indicating a type of IDC interference at the UE and indicating a set of interference parameters associated with the IDC interference, wherein the set of interference parameters corresponds to an interference pattern of the IDC interference in a time domain; receiving a message indicating one or more operating parameters associated with a time period that is based at least in part on the interference pattern, the one or more operating parameters based at least in part on the type of IDC interference, the set of interference parameters, and the interference pattern; and communicating with a network entity during the time period based at least in part on the one or more operating parameters.

Aspect 2: The method of aspect 1, further comprising: receiving control signaling indicating a TDD pattern, a DRX pattern, a gap pattern, or any combination thereof based at least in part on the type of IDC, the set of interference parameters, and the interference pattern; and communicating with the network entity during the time period based at least in part on the TDD pattern, the DRX pattern, the gap pattern, or any combination thereof.

Aspect 3: The method of any of aspects 1 through 2, wherein transmitting the assistance information comprises: transmitting a UAI message that indicates a frequency intermodulation between an MN and an SN, wherein the IDC interference is based at least in part on the frequency intermodulation.

Aspect 4: The method of any of aspects 1 through 3, further comprising: transmitting the assistance information indicating uplink traffic at the UE and indicating the set of interference parameters, wherein the set of interference parameters corresponds to the interference pattern of the uplink traffic in the time domain and in a frequency domain; receiving control signaling indicating to delay reception of a Wi-Fi transmission until after the time period based at least in part on the uplink traffic, the set of interference parameters, and the interference pattern; and receiving the Wi-Fi transmission after the time period based at least in part on the control signaling.

Aspect 5: The method of any of aspects 1 through 4, further comprising: transmitting the assistance information indicating an eSCO interference and indicating the set of interference parameters, wherein the set of interference parameters corresponds to the interference pattern of the eSCO interference in the time domain and in a frequency domain; receiving control signaling indicating an eSCO interval comprising a transmit slot and a receive slot and indicating a start time of the eSCO interval based at least in part on the eSCO interference, the set of interference parameters, and the interference pattern; and receiving a signal during the eSCO interval based at least in part on the control signaling.

Aspect 6: The method of any of aspects 1 through 5, further comprising: transmitting the assistance information indicating a bit period interference at a non-terrestrial device and indicating the set of interference parameters comprising a start time parameter, a duration parameter, and an offset parameter, wherein the set of interference parameters corresponds to the interference pattern of the bit period interference in the time domain and in a frequency domain; receiving control signaling indicating a phase associated with a bit period for communicating with the non-terrestrial device based at least in part on the bit period interference, the start time parameter, the duration parameter, and the offset parameter; and communicating with the non-terrestrial device during the time period based at least in part on the phase.

Aspect 7: The method of any of aspects 1 through 6, further comprising: transmitting the assistance information indicating a frequency intermodulation interference between an MN and an SN and indicating the set of interference parameters, wherein the set of interference parameters comprises at least a dual connectivity parameter and corresponds to the interference pattern of the frequency intermodulation interference in the time domain and a frequency domain; receiving control signaling indicating the one or more operating parameters associated with the time period that is based at least in part on the frequency intermodulation interference and the dual connectivity parameter; and receiving one or more messages from the MN and the SN during the time period based at least in part on the one or more operating parameters.

Aspect 8: The method of any of aspects 1 through 7, wherein transmitting the assistance information comprises: transmitting a UAI message that indicates the set of interference parameters, wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

Aspect 9: The method of aspect 8, wherein the periodicity parameter indicates a periodicity of the interference pattern.

Aspect 10: The method of any of aspects 8 through 9, wherein the periodicity parameter indicates a start time, an end time, and a duration of the interference pattern.

Aspect 11: The method of any of aspects 8 through 10, wherein the time offset parameter indicates a time offset between a first start time of the interference pattern and a second start time of a transmission that creates the IDC interference.

Aspect 12: The method of any of aspects 8 through 11, wherein the power parameter indicates a maximum power the UE is to use during the time period.

Aspect 13: The method of any of aspects 1 through 12, wherein transmitting the assistance information comprises: transmitting a UAI message that indicates the set of interference parameters that corresponds to the interference pattern of the IDC interference in a frequency domain, wherein the set of interference parameters comprises a BWP parameter, a physical resource block set parameter, a center frequency parameter, a bandwidth parameter, a dual connectivity parameter, or any combination thereof.

Aspect 14: The method of aspect 13, wherein the BWP parameter indicates an identifier of a BWP associated with the IDC interference.

Aspect 15: The method of any of aspects 13 through 14, wherein the physical resource block set parameter indicates a physical resource block in which the interference pattern begins, a quantity of physical resource blocks included in the interference pattern, or both.

Aspect 16: The method of any of aspects 13 through 15, wherein the dual connectivity parameter indicates whether the IDC interference is associated with a frequency intermodulation in dual connectivity.

Aspect 17: A method for wireless communication at a network entity, comprising: receiving assistance information associated with a UE, the assistance information indicating a type of IDC interference at the UE and indicating a set of interference parameters associated with the IDC interference, wherein the set of interference parameters corresponds to an interference pattern of the IDC interference in a time domain; transmitting a message indicating one or more operating parameters associated with a time period that is based at least in part on the interference pattern, the one or more operating parameters based at least in part on the type of IDC interference, the set of interference parameters, and the interference pattern; and communicating with the UE during the time period based at least in part on the one or more operating parameters.

Aspect 18: The method of aspect 17, further comprising: transmitting control signaling indicating a TDD pattern, a DRX pattern, a gap pattern, or any combination thereof based at least in part on the type of IDC, the set of interference parameters, and the interference pattern; and communicating with the UE during the time period based at least in part on the TDD pattern, the DRX pattern, the gap pattern, or any combination thereof.

Aspect 19: The method of any of aspects 17 through 18, wherein receiving the assistance information comprises: receiving a UAI message that indicates a frequency intermodulation between an MN and an SN, wherein the IDC interference is based at least in part on the frequency intermodulation.

Aspect 20: The method of any of aspects 17 through 19, further comprising: receiving the assistance information indicating uplink traffic at the UE and indicating the set of interference parameters, wherein the set of interference parameters corresponds to the interference pattern of the uplink traffic in the time domain and in a frequency domain; transmitting control signaling indicating to delay reception of a Wi-Fi transmission until after the time period based at least in part on the uplink traffic, the set of interference parameters, and the interference pattern; and transmitting the Wi-Fi transmission after the time period based at least in part on the control signaling.

Aspect 21: The method of any of aspects 17 through 20, further comprising: receiving the assistance information indicating an eSCO interference and indicating the set of interference parameters, wherein the set of interference parameters corresponds to the interference pattern of the eSCO interference in the time domain and in a frequency domain; transmitting control signaling indicating an eSCO interval comprising a transmit slot and a receive slot and indicating a start time of the eSCO interval based at least in part on the eSCO interference, the set of interference parameters, and the interference pattern; and transmitting a signal during the eSCO interval based at least in part on the control signaling.

Aspect 22: The method of any of aspects 17 through 21, further comprising: receiving the assistance information indicating a bit period interference at a non-terrestrial device and indicating the set of interference parameters comprising a start time parameter, a duration parameter, and an offset parameter, wherein the set of interference parameters corresponds to the interference pattern of the bit period interference in the time domain and in a frequency domain; transmitting control signaling indicating a phase associated with a bit period for communicating with the non-terrestrial device based at least in part on the bit period interference, the start time parameter, the duration parameter, and the offset parameter; and communicating with the non-terrestrial device during the time period based at least in part on the phase.

Aspect 23: The method of any of aspects 17 through 22, further comprising: receiving the assistance information indicating a frequency intermodulation interference between an MN and an SN and indicating the set of interference parameters, wherein the set of interference parameters comprises at least a dual connectivity parameter and corresponds to the interference pattern of the frequency intermodulation interference in the time domain and a frequency domain; transmitting control signaling indicating the one or more operating parameters associated with the time period that is based at least in part on the frequency intermodulation interference and the dual connectivity parameter; and transmitting one or more messages from the MN and the SN during the time period based at least in part on the one or more operating parameters.

Aspect 24: The method of any of aspects 17 through 23, wherein receiving the assistance information comprises: receiving a UAI message that indicates the set of interference parameters, wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof.

Aspect 25: The method of aspect 24, wherein the periodicity parameter indicates a periodicity of the interference pattern.

Aspect 26: The method of any of aspects 24 through 25, wherein the periodicity parameter indicates a start time, an end time, and a duration of the interference pattern.

Aspect 27: The method of any of aspects 24 through 26, wherein the time offset parameter indicates a time offset between a first start time of the interference pattern and a second start time of a transmission that creates the IDC interference.

Aspect 28: The method of any of aspects 24 through 27, wherein the power parameter indicates a maximum power the UE is to use during the time period.

Aspect 29: The method of any of aspects 17 through 28, wherein receiving the assistance information comprises: receiving a UAI message that indicates the set of interference parameters that corresponds to the interference pattern of the IDC interference in a frequency domain, wherein the set of interference parameters comprises a BWP parameter, a physical resource block set parameter, a center frequency parameter, a bandwidth parameter, a dual connectivity parameter, or any combination thereof.

Aspect 30: The method of aspect 29, wherein the BWP parameter indicates an identifier of a BWP associated with the IDC interference.

Aspect 31: The method of any of aspects 29 through 30, wherein the physical resource block set parameter indicates a physical resource block in which the interference pattern begins, a quantity of physical resource blocks included in the interference pattern, or both.

Aspect 32: The method of any of aspects 29 through 31, wherein the dual connectivity parameter indicates whether the IDC interference is associated with a frequency intermodulation in dual connectivity.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communication at a network entity, comprising a processor; memory coupled with the processor; and instructions stored in the memory and executable by the processor to cause the apparatus to perform a method of any of aspects 17 through 32.

Aspect 37: An apparatus for wireless communication at a network entity, comprising at least one means for performing a method of any of aspects 17 through 32.

Aspect 38: A non-transitory computer-readable medium storing code for wireless communication at a network entity, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting assistance information associated with the UE, the assistance information indicating a type of in-device coexistence interference at the UE and indicating a set of interference parameters associated with the in-device coexistence interference, wherein the set of interference parameters corresponds to an interference pattern of the in-device coexistence interference in a time domain, and wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof;
   receiving a message indicating one or more operating parameters associated with a time period that is based at least in part on the interference pattern, the one or more operating parameters based at least in part on the type of in-device coexistence interference, the set of interference parameters, and the interference pattern; and
   communicating with a network entity during the time period based at least in part on the one or more operating parameters.

2. The method of claim 1, further comprising:
   receiving control signaling indicating a time division duplex pattern, a discontinuous reception pattern, a gap pattern, or any combination thereof based at least in part on the type of in-device coexistence, the set of interference parameters, and the interference pattern; and
   communicating with the network entity during the time period based at least in part on the time division duplex pattern, the discontinuous reception pattern, the gap pattern, or any combination thereof.

3. The method of claim 1, wherein transmitting the assistance information comprises:
   transmitting a UE assistance information message that indicates a frequency intermodulation between a master node and a secondary node, wherein the in-device coexistence interference is based at least in part on the frequency intermodulation.

4. The method of claim 1, further comprising:
   transmitting the assistance information indicating uplink traffic at the UE and indicating the set of interference parameters, wherein the set of interference parameters corresponds to the interference pattern of the uplink traffic in the time domain and in a frequency domain;
   receiving control signaling indicating to delay reception of a Wi-Fi transmission until after the time period based at least in part on the uplink traffic, the set of interference parameters, and the interference pattern; and
   receiving the Wi-Fi transmission after the time period based at least in part on the control signaling.

5. The method of claim 1, further comprising:
   transmitting the assistance information indicating an extended synchronous connection oriented interference and indicating the set of interference parameters, wherein the set of interference parameters corresponds to the interference pattern of the extended synchronous connection oriented interference in the time domain and in a frequency domain;
receiving control signaling indicating an extended synchronous connection oriented interval comprising a transmit slot and a receive slot and indicating a start time of the extended synchronous connection oriented interval based at least in part on the extended synchronous connection oriented interference, the set of interference parameters, and the interference pattern; and
receiving a signal during the extended synchronous connection oriented interval based at least in part on the control signaling.

6. The method of claim 1, further comprising:
transmitting the assistance information indicating a bit period interference at a non-terrestrial device and indicating the set of interference parameters comprising a start time parameter, a duration parameter, and an offset parameter, wherein the set of interference parameters corresponds to the interference pattern of the bit period interference in the time domain and in a frequency domain;
receiving control signaling indicating a phase associated with a bit period for communicating with the non-terrestrial device based at least in part on the bit period interference, the start time parameter, the duration parameter, and the offset parameter; and
communicating with the non-terrestrial device during the time period based at least in part on the phase.

7. The method of claim 1, further comprising:
transmitting the assistance information indicating a frequency intermodulation interference between a master node and a secondary node and indicating the set of interference parameters, wherein the set of interference parameters comprises at least a dual connectivity parameter and corresponds to the interference pattern of the frequency intermodulation interference in the time domain and a frequency domain;
receiving control signaling indicating the one or more operating parameters associated with the time period that is based at least in part on the frequency intermodulation interference and the dual connectivity parameter; and
receiving one or more messages from the master node and the secondary node during the time period based at least in part on the one or more operating parameters.

8. The method of claim 1, wherein the periodicity parameter indicates a periodicity of the interference pattern.

9. The method of claim 1, wherein the periodicity parameter indicates a start time, an end time, and a duration of the interference pattern.

10. The method of claim 1, wherein the time offset parameter indicates a time offset between a first start time of the interference pattern and a second start time of a transmission that creates the in-device coexistence interference.

11. The method of claim 1, wherein the power parameter indicates a maximum power the UE is to use during the time period.

12. The method of claim 1, wherein transmitting the assistance information comprises:
transmitting a UE assistance information message that indicates the set of interference parameters that corresponds to the interference pattern of the in-device coexistence interference in a frequency domain, wherein the set of interference parameters comprises a bandwidth part parameter, a physical resource block set parameter, a center frequency parameter, a bandwidth parameter, a dual connectivity parameter, or any combination thereof.

13. The method of claim 12, wherein the bandwidth part parameter indicates an identifier of a bandwidth part associated with the in-device coexistence interference.

14. The method of claim 12, wherein the physical resource block set parameter indicates a physical resource block in which the interference pattern begins, a quantity of physical resource blocks included in the interference pattern, or both.

15. The method of claim 12, wherein the dual connectivity parameter indicates whether the in-device coexistence interference is associated with a frequency intermodulation in dual connectivity.

16. A method for wireless communication at a network entity, comprising:
receiving assistance information associated with a user equipment (UE), the assistance information indicating a type of in-device coexistence interference at the UE and indicating a set of interference parameters associated with the in-device coexistence interference, wherein the set of interference parameters corresponds to an interference pattern of the in-device coexistence interference in a time domain;
transmitting a message indicating one or more operating parameters associated with a time period that is based at least in part on the interference pattern, the one or more operating parameters based at least in part on the type of in-device coexistence interference, the set of interference parameters, and the interference pattern, and wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof; and
communicating with the UE during the time period based at least in part on the one or more operating parameters.

17. The method of claim 16, further comprising:
transmitting control signaling indicating a time division duplex pattern, a discontinuous reception pattern, a gap pattern, or any combination thereof based at least in part on the type of in-device coexistence, the set of interference parameters, and the interference pattern; and
communicating with the UE during the time period based at least in part on the time division duplex pattern, the discontinuous reception pattern, the gap pattern, or any combination thereof.

18. The method of claim 16, wherein receiving the assistance information comprises:
receiving a UE assistance information message that indicates a frequency intermodulation between a master node and a secondary node, wherein the in-device coexistence interference is based at least in part on the frequency intermodulation.

19. The method of claim 16, further comprising:
receiving the assistance information indicating uplink traffic at the UE and indicating the set of interference parameters, wherein the set of interference parameters corresponds to the interference pattern of the uplink traffic in the time domain and in a frequency domain;
transmitting control signaling indicating to delay reception of a Wi-Fi transmission until after the time period based at least in part on the uplink traffic, the set of interference parameters, and the interference pattern; and transmitting the Wi-Fi transmission after the time period based at least in part on the control signaling.

20. The method of claim 16, further comprising:

receiving the assistance information indicating an extended synchronous connection oriented interference and indicating the set of interference parameters, wherein the set of interference parameters corresponds to the interference pattern of the extended synchronous connection oriented interference in the time domain and in a frequency domain;

transmitting control signaling indicating an extended synchronous connection oriented interval comprising a transmit slot and a receive slot and indicating a start time of the extended synchronous connection oriented interval based at least in part on the extended synchronous connection oriented interference, the set of interference parameters, and the interference pattern; and transmitting a signal during the extended synchronous connection oriented interval based at least in part on the control signaling.

21. The method of claim 16, further comprising:

receiving the assistance information indicating a bit period interference at a non-terrestrial device and indicating the set of interference parameters comprising a start time parameter, a duration parameter, and an offset parameter, wherein the set of interference parameters corresponds to the interference pattern of the bit period interference in the time domain and in a frequency domain;

transmitting control signaling indicating a phase associated with a bit period for communicating with the non-terrestrial device based at least in part on the bit period interference, the start time parameter, the duration parameter, and the offset parameter; and communicating with the non-terrestrial device during the time period based at least in part on the phase.

22. The method of claim 16, further comprising:

receiving the assistance information indicating a frequency intermodulation interference between a master node and a secondary node and indicating the set of interference parameters, wherein the set of interference parameters comprises at least a dual connectivity parameter and corresponds to the interference pattern of the frequency intermodulation interference in the time domain and a frequency domain;

transmitting control signaling indicating the one or more operating parameters associated with the time period that is based at least in part on the frequency intermodulation interference and the dual connectivity parameter; and transmitting one or more messages from the master node and the secondary node during the time period based at least in part on the one or more operating parameters.

23. The method of claim 16, wherein the periodicity parameter indicates a periodicity of the interference pattern.

24. The method of claim 16, wherein the periodicity parameter indicates a start time, an end time, and a duration of the interference pattern.

25. The method of claim 16, wherein the time offset parameter indicates a time offset between a first start time of the interference pattern and a second start time of a transmission that creates the in-device coexistence interference.

26. The method of claim 16, wherein the power parameter indicates a maximum power the UE is to use during the time period.

27. An apparatus for wireless communication at a user equipment (UE), comprising:

a processor;

memory coupled with the processor; and instructions stored in the memory and executable by the processor to cause the apparatus to:

transmit assistance information associated with the UE, the assistance information indicating a type of in-device coexistence interference at the UE and indicating a set of interference parameters associated with the in-device coexistence interference, wherein the set of interference parameters corresponds to an interference pattern of the in-device coexistence interference in a time domain;

receive a message indicating one or more operating parameters associated with a time period that is based at least in part on the interference pattern, the one or more operating parameters based at least in part on the type of in-device coexistence interference, the set of interference parameters, and the interference pattern, and wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof; and communicate with a network entity during the time period based at least in part on the one or more operating parameters.

28. An apparatus for wireless communication at a network entity, comprising:

a processor;

memory coupled with the processor; and instructions stored in the memory and executable by the processor to cause the apparatus to:

receive assistance information associated with a user equipment (UE), the assistance information indicating a type of in-device coexistence interference at the UE and indicating a set of interference parameters associated with the in-device coexistence interference, wherein the set of interference parameters corresponds to an interference pattern of the in-device coexistence interference in a time domain;

transmit a message indicating one or more operating parameters associated with a time period that is based at least in part on the interference pattern, the one or more operating parameters based at least in part on the type of in-device coexistence interference, the set of interference parameters, and the interference pattern, and wherein the set of interference parameters comprises a periodicity parameter, a frame offset parameter, a time offset parameter, an offset uncertainty parameter, a duration parameter, a start time parameter, a power parameter, an interference direction parameter, a system type parameter, a system protocol parameter, or any combination thereof; and communicate with the UE during the time period based at least in part on the one or more operating parameters.

* * * * *